(12) United States Patent
Usami

(10) Patent No.: US 8,445,186 B2
(45) Date of Patent: May 21, 2013

(54) RECESSED PORTION FORMING METHOD, METHOD FOR MANUFACTURING PIT-PROJECTION PRODUCT, METHOD FOR MANUFACTURING LIGHT EMITTING ELEMENT, AND METHOD FOR MANUFACTURING OPTICAL ELEMENT

(75) Inventor: Yoshihisa Usami, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 357 days.

(21) Appl. No.: 12/682,863

(22) PCT Filed: Oct. 7, 2008

(86) PCT No.: PCT/JP2008/002817
§ 371 (c)(1),
(2), (4) Date: Apr. 13, 2010

(87) PCT Pub. No.: WO2009/050857
PCT Pub. Date: Apr. 23, 2009

(65) Prior Publication Data
US 2010/0233631 A1  Sep. 16, 2010

(30) Foreign Application Priority Data
Oct. 15, 2007 (JP) ................... 2007-267665

(51) Int. Cl.
*G03H 1/02* (2006.01)

(52) U.S. Cl.
USPC ........... 430/321; 430/2; 430/1; 430/30; 359/3

(58) Field of Classification Search
None
See application file for complete search history.

(56) References Cited

U.S. PATENT DOCUMENTS

| 4,517,667 | A | * | 5/1985 | Sprague | 369/122 |
| 4,551,413 | A | * | 11/1985 | Bell | 430/270.2 |
| 5,084,370 | A | * | 1/1992 | Bell et al. | 430/270.15 |
| 5,099,469 | A | * | 3/1992 | Dobbin et al. | 369/53.11 |
| 2004/0150979 | A1 | * | 8/2004 | Lambertini et al. | 362/31 |

FOREIGN PATENT DOCUMENTS

| EP | 0 051 283 A1 | 5/1982 |
| JP | 55-101144 A | 8/1980 |
| JP | 57-103139 A | 6/1982 |

(Continued)

OTHER PUBLICATIONS

Wilkinson et al. "DVD mastering using dye polymer media", Proc. SPIE vol. 3109, 160-166 (1997).*

(Continued)

*Primary Examiner* — Martin Angebranndt
(74) *Attorney, Agent, or Firm* — Sughrue Mion, PLLC

(57) ABSTRACT

A recessed portion forming method for forming a plurality of recessed portions in a thermally deformable heat mode recording material layer is provided, which method includes: a recessed portion forming step of applying condensed light emitted from an optical system including a light source, to the recording material layer to form the recessed portions; an inspection light illumination step of applying inspection light to the recessed portions during or after formation of the recessed portions in the recording material layer; a detection step of detecting a light quantity of the inspection light reflected or diffracted from the recessed portions; and an output regulation step of regulating an output of the light source based upon the light quantity so that the light quantity becomes a predetermined value. Methods for manufacturing a pit-projection product, a light emitting element, and an optical element, using this method are also provided.

12 Claims, 13 Drawing Sheets

FOREIGN PATENT DOCUMENTS

| JP | 60-098535 A | | 6/1985 |
|---|---|---|---|
| JP | 62-053883 A | | 3/1987 |
| JP | 05-040936 | * | 2/1993 |
| JP | 07-161080 A | | 6/1995 |
| JP | 10-065219 A | | 3/1998 |
| JP | 11-287620 A | | 10/1999 |
| JP | 11345434 A | | 12/1999 |
| JP | 2001-202662 A | | 7/2001 |
| JP | 2003-069075 A | | 3/2003 |
| JP | 2003162837 A | | 6/2003 |
| JP | 2005-203737 A | | 7/2005 |
| JP | 2007-235085 A | | 9/2007 |

OTHER PUBLICATIONS

Kim et al. "Enhanced light extraction from GaN-based light emitting diodes with holographically generated two-dimensional photonic crystal patterns", Appl. Phys. Lett., vol. 87 pp. 203508-1 to 203508-3 (2005).*

Hoche et al., "Nanoscale laser patterning of thin gold films", Phil. Mag. Lett., vol. 86(10) pp. 661-667 (Oct. 2006).*

Rochon et al., "Optically induced surface grating on aromatic polymer films", Appl. Phys. Lett., vol. 66(2) pp. 136-138 (Jan. 1995).*

Keiser "videodisc mastering", RCA review vol. 39(1) pp. 60-86 (Mar. 1978).*

Stasi et al., "Aluminum pre-patterning for highyl ordered nanoporous anodized alumina", Photon & Nano., vol. 5 pp. 136-139 (Aug. 2007).*

First Office Action, dated Feb. 23, 2011, issued in corresponding CN Application No. 200880111779.7, 12 pages in English and Chinese.

Notification of Reasons for Refusal, dated Feb. 12, 2013, issued in related JP Application No. 2008-242892, 4 pages in English and Japanese.

* cited by examiner

FIG. 2
(a)
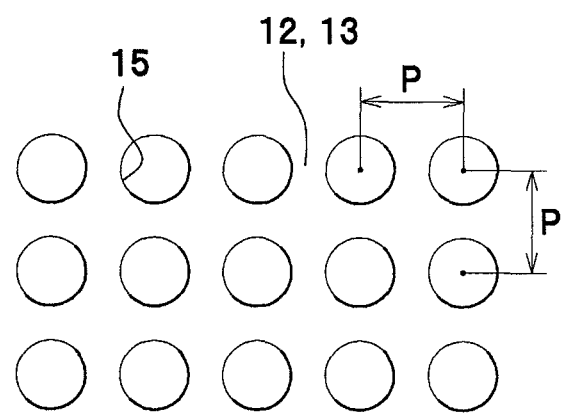
(b)
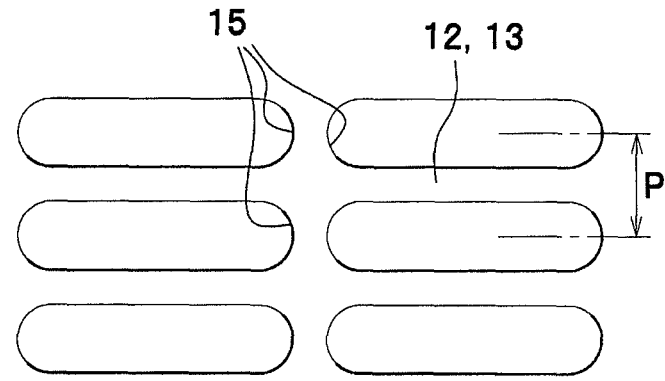

FIG. 3
(a)
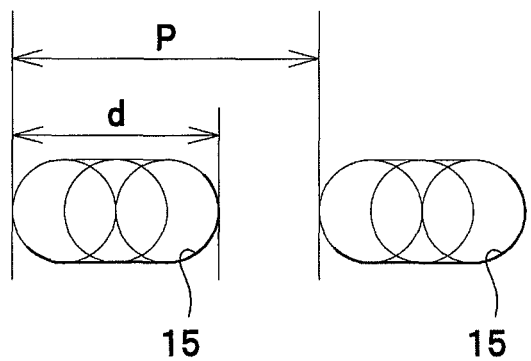
(b)
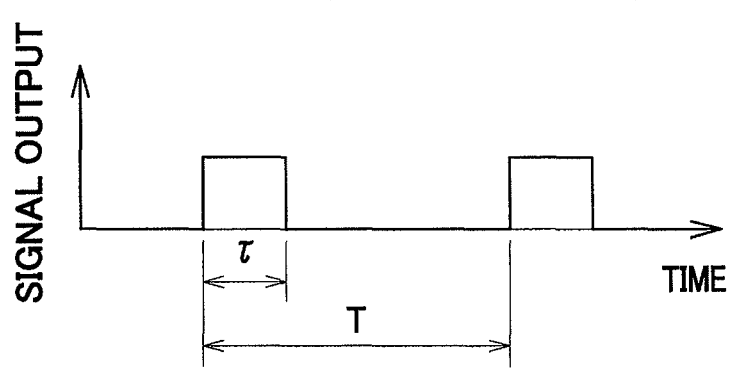

FIG. 7
(a)
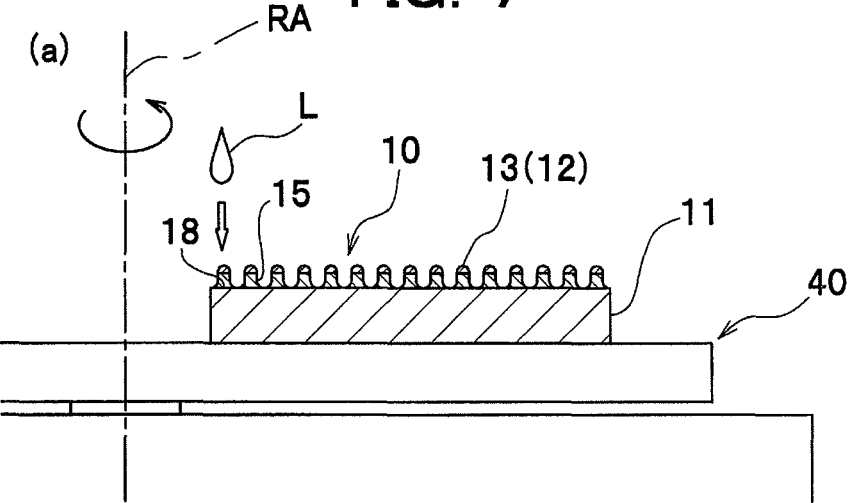
(b)
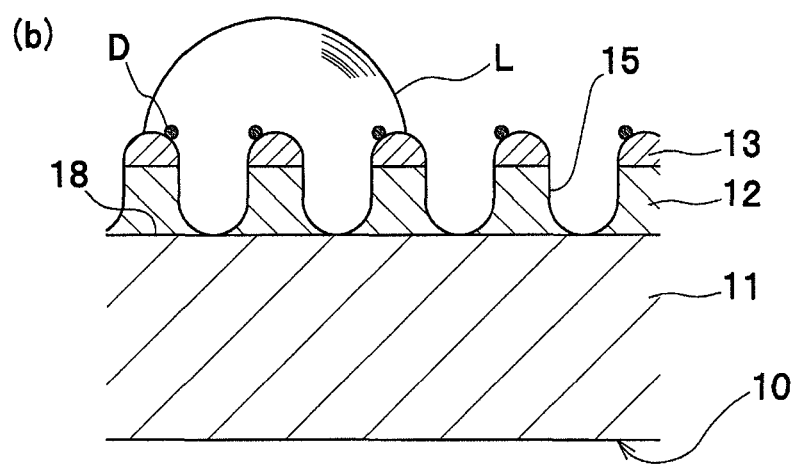
(c)
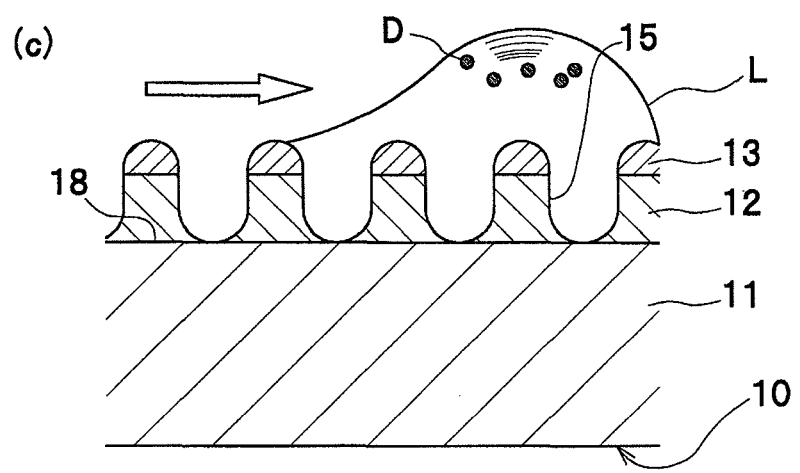

FIG. 9
(a)
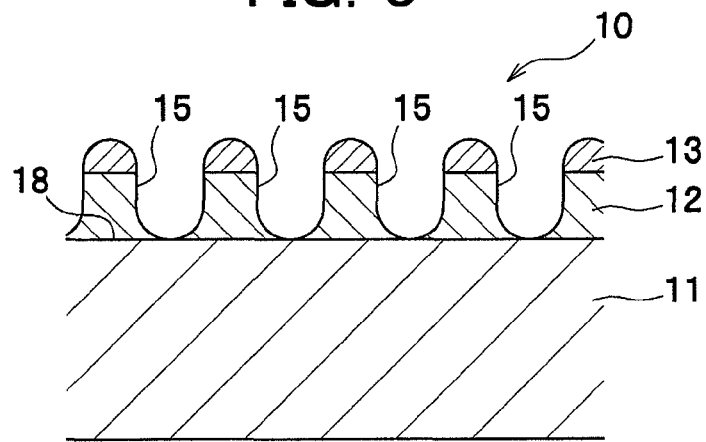
(b)
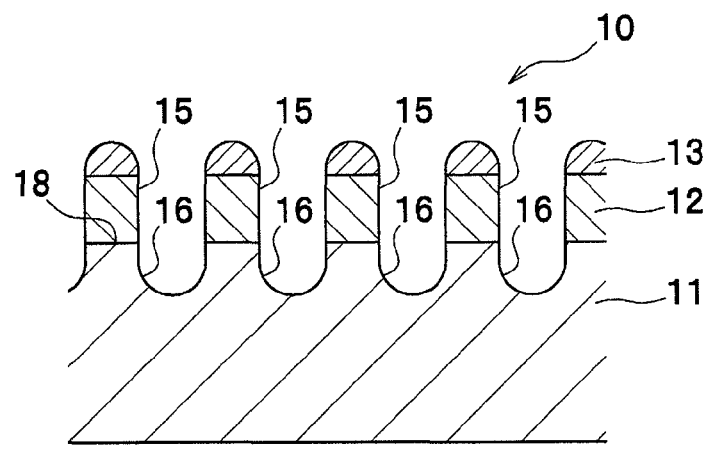
(c)
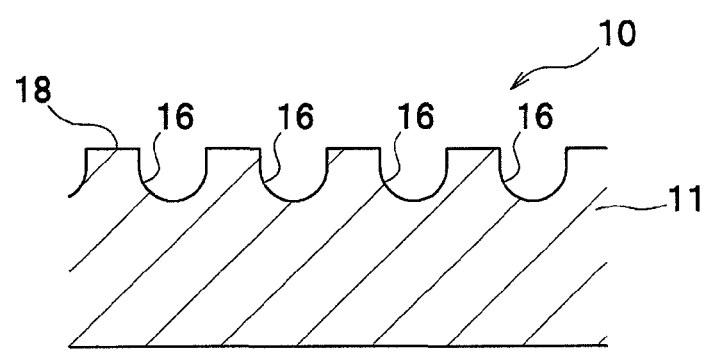

FIG. 10
(a)
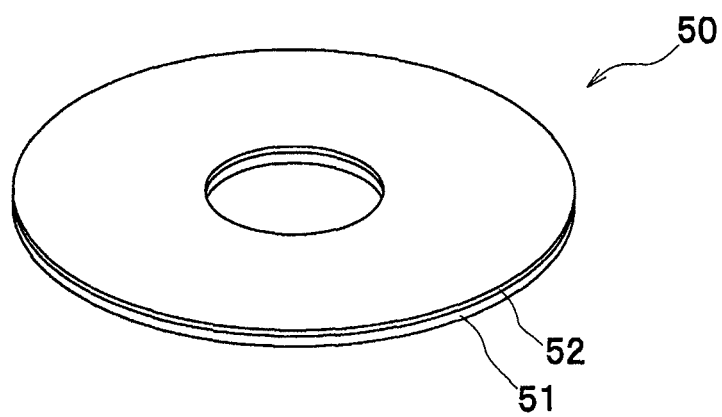
(b)
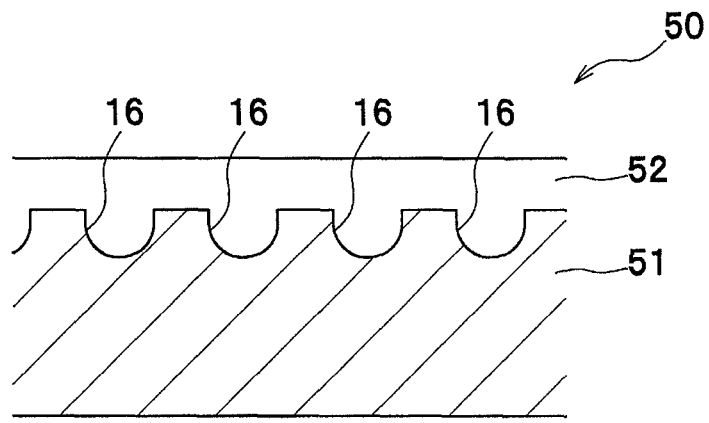

FIG. 11
(a)
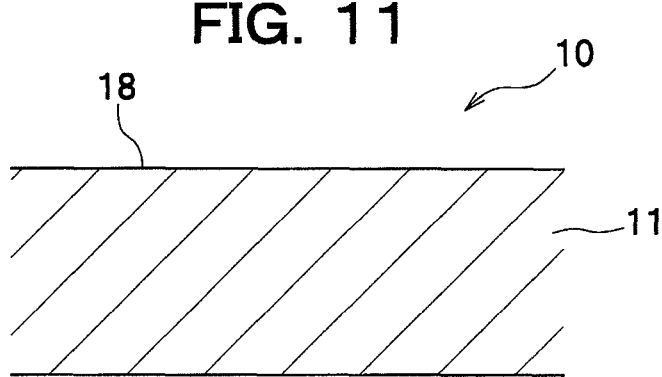
(b)
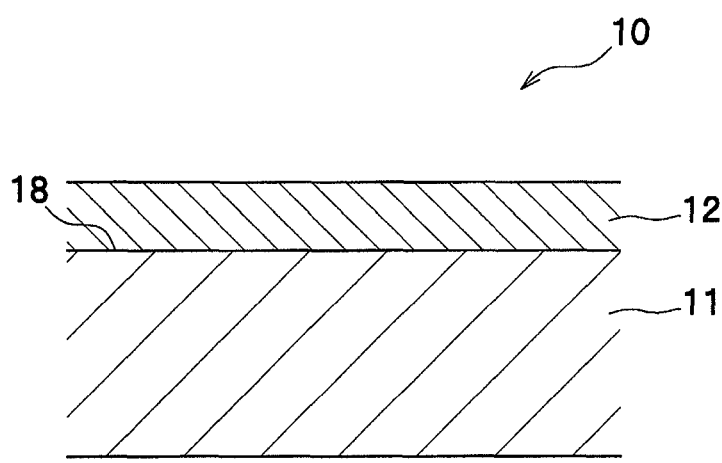
(c)
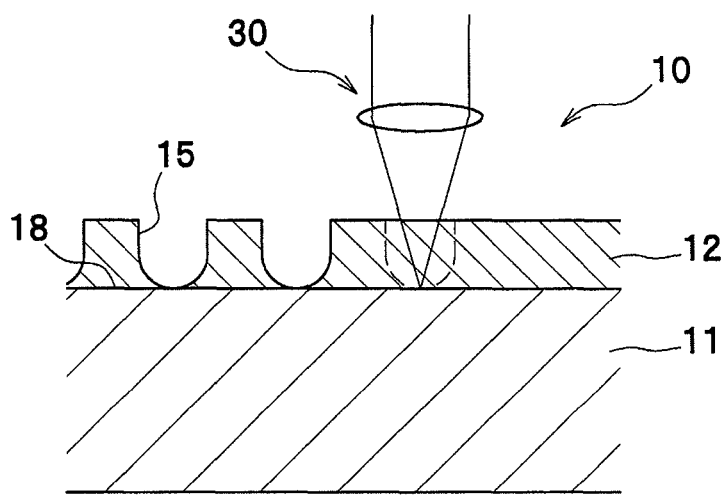

FIG. 12
(a) 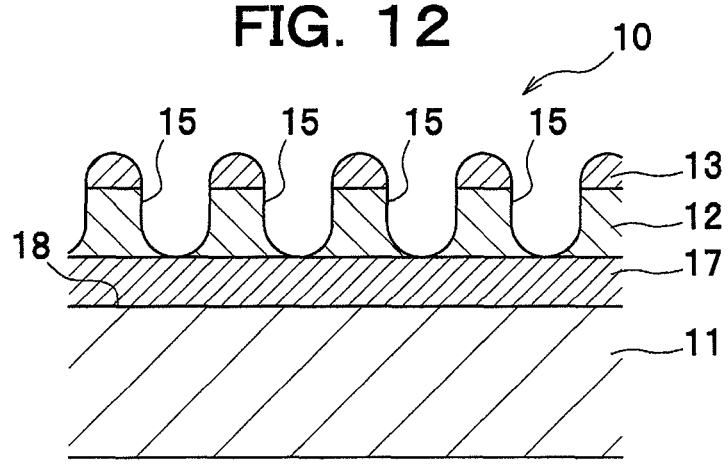
(b) 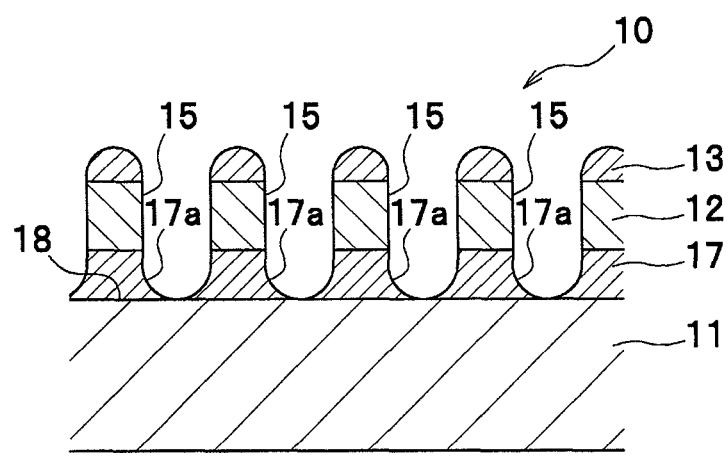
(c) 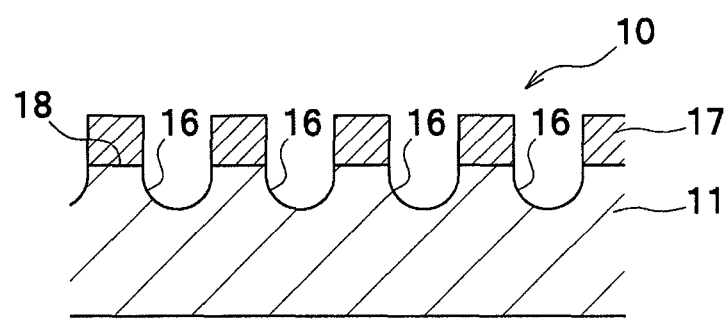
(d) 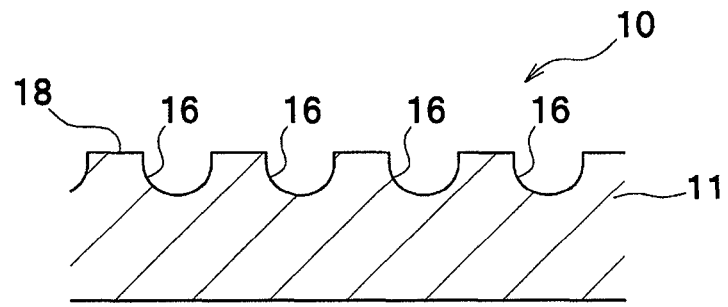

RECESSED PORTION FORMING METHOD, METHOD FOR MANUFACTURING PIT-PROJECTION PRODUCT, METHOD FOR MANUFACTURING LIGHT EMITTING ELEMENT, AND METHOD FOR MANUFACTURING OPTICAL ELEMENT

TECHNICAL FIELD

The present invention relates to a recessed portion forming method for neatly forming recessed portions in a heat mode type recording material layer, and methods for manufacturing a pit-projection product, for manufacturing a light emitting element and for manufacturing an optical element, using the method.

BACKGROUND ART

Among hitherto known methods for forming pits and projections in a predetermined target object such as an optical disc, a master disc for manufacturing an optical disc and a light emitting element having a light emitting surface formed with pits and projections is a method in which a photoresist is used as described, for example, in JP 7-161080 A. To be more specific, this method comprises an application step in which a photoresist is applied to a master disc, a light exposure step in which the photoresist is exposed to a laser beam, a development step in which an exposed portion is removed with a developing solution to form predetermined recessed portions, an etching step in which a reactive ion etching (hereinafter referred to as "RIE") is performed to etch the master disc, and a stripping step in which a residual resist is stripped off, whereby pits and projections are formed in the master disc.

In this method in which pits and projections are formed by etching, failure to have recessed portions neatly formed on the photoresist as a mask for use in etching would disadvantageously result in failure to neatly form pits and projections in the master disc. To address this problem, a method has been proposed in which the processing quality of recessed portions formed on the photoresist is inspected after exposure and development of the photoresist.

However, according to the prior art technique as described above, the processing quality inspection should be performed after the development step, and thus the result of inspection cannot be utilized as feedback for processing (processing of recessed portions by exposure to light) of the product being inspected. That is, if the amount of light exposure of a portion corresponding to the recessed portion becomes out of desired values halfway through the exposure to light for some reason, then the subsequent light exposure will not be performed properly, and all the recessed portions formed in portions in which light exposure has been performed improperly will disadvantageously become defective.

DISCLOSURE OF INVENTION

The inventor of the present application has devised a method for forming pits and projections, which may be better than the prior art method utilizing a photoresist and RIE. To be more specific, the method comprises etching using a heat mode resist material in which holes are formed by application of a condensed laser beam, instead of the aforementioned photoresist. The inventor of the present application also conceives an idea of forming pits and projections without etching, wherein a heat mode resist material in which recessed portions are formed by application of a laser beam is retained as it is. In these methods, as well, inspection to check whether or not the heat mode resist material has recessed portions formed neatly is important, and the challenge has been to swiftly assess the processing quality in the inspection to thereby reduce the occurrence of defective portions.

With this in view, it is an object of the present invention to provide a recessed portion forming method, a method for manufacturing a pit-projection product, a method for manufacturing a light emitting element and a method for manufacturing an optical element by which the processing quality can be swiftly assessed to reduce the occurrence of defective portions.

The present invention, which may solve the above-described problems, includes a recessed portion forming method for forming a plurality of recessed portions in a thermally deformable heat mode recording material layer, comprising: a recessed portion forming step of applying condensed light to the recording material layer to form the recessed portions, the condensed light being emitted from an optical system which includes a light source; an inspection light illumination step of applying inspection light to the recessed portions during or after formation of the recessed portions in the recording material layer; a detection step of detecting a light quantity of the inspection light reflected or diffracted from the recessed portions; and an output regulation step of regulating an output of the light source based upon the light quantity so that the light quantity becomes a predetermined value.

According to this aspect of the invention, in the recessed portion forming process, the recessed portions can be formed merely by applying condensed light to the recording material layer. Therefore, in contrast to the recessed portion forming method utilizing a photoresist as conventionally adopted, the recessed portions can be formed without the development step, and thus the inspection light is applied to the recessed portions to inspect the recessed portions, immediately after or during the formation of the recessed portions by the condensed light, so that the processing quality can be swiftly assessed. By swiftly assessing the processing quality during the recessed portion forming step as such, the inspection results can be utilized as feedback for the processing in the same recessed portion forming step, and the occurrence of defected portions can be reduced.

In this aspect of the invention, the light emitted from said light source may be utilized as the inspection light.

This makes it possible to simplify the apparatus, and to reduce the cost.

Alternatively, the inspection light may be emitted by another light source which is different from said light source.

When the same light source is used, the conditions represented before completion of deformation of the recessed portions are monitored; on the other hand, when a different light source is used, the conditions in which the deformation has been completely finished can be monitored. When the same light source is used, a beam of light having the same breadth is used for monitoring, and thus information which can be obtained is the information on the pit under processing only. However, when a different light source is used and a broader beam of light is used for monitoring, advantageously, the position relative to that of an adjacent portion or deformation derived from interference therewith can be monitored. On the other hand, when the same light source is used, the monitoring can be carried out in real time and achieved with a simpler device configuration.

The recessed portion forming method according to this aspect of the invention as described above may be utilized in a method for manufacturing a pit-projection product such as an optical disc or a semiconductor, a method for manufacturing a light emitting element, and a method for manufacturing an optical element.

According to the present invention, the use of a thermally deformable heat mode recording material layer allows the formation of recessed portions to be achieved merely by applying condensed light, with the result that the processing quality can swiftly be assessed by applying inspection light to the recessed portions. Furthermore, the results of processing quality inspection as thus detected can be provided as feedback for forming the recessed portions, and thus the occurrence of defected portions can be reduced.

BRIEF DESCRIPTION OF THE DRAWINGS

FIG. 2 (*a*) is a diagram showing one example of a light emission surface as seen in plan view, and (*b*) is a diagram showing another example of a light emission surface as seen in plan view.

FIG. 3 (*a*) is a diagram explaining a relation between diameter and pitch of recessed portions, and (*b*) is a diagram explaining a relation between light-emitting time and period of a laser beam.

FIG. 5 is a diagram showing an optical disc drive for forming recessed portions in a recording material layer or the like.

FIGS. 7 (*a*)-(*c*) are diagrams showing a cleaning process.

FIGS. 9 (*a*)-(*c*) are diagrams showing a process for manufacturing an LED element according to a third embodiment.

FIG. 10 (*a*) is a perspective view of an optical disc manufactured by a manufacturing method which comprises a recessed portion forming method according to the present invention, and (*b*) is a sectional view thereof.

FIGS. 11 (*a*)-(*c*) are diagrams showing an embodiment in which a barrier layer forming step is omitted from the manufacturing process according to the first embodiment.

FIGS. 12 (*a*)-(*d*) are diagrams showing an embodiment as implemented with modifications made to the process of manufacturing an LED element according to the third embodiment.

BEST MODES FOR CARRYING OUT THE INVENTION

First Embodiment

Next, a method for manufacturing a light emitting element according to the present invention will be described with reference to the drawings.

Figure 1:
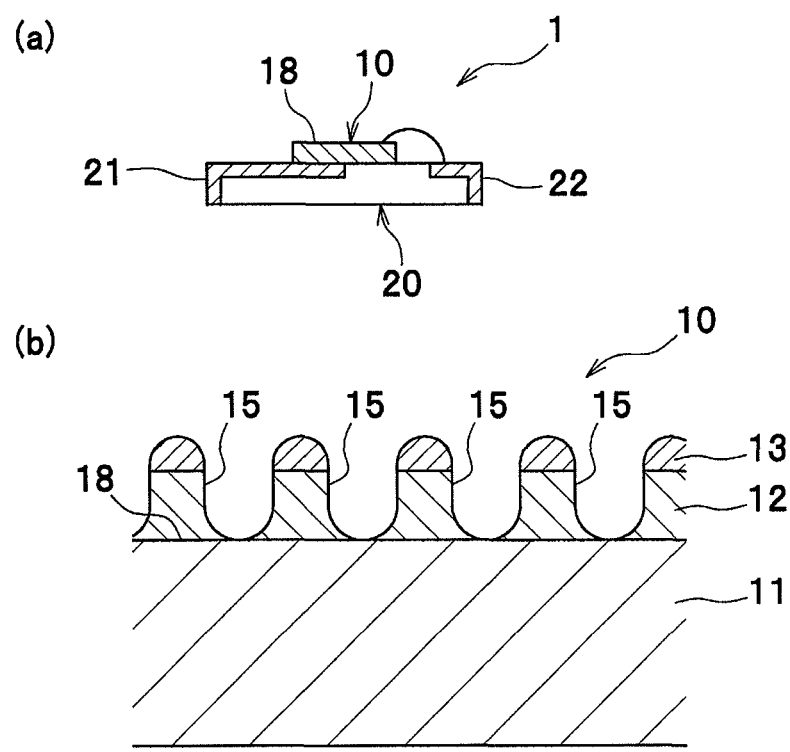
FIG. 1 (*a*) is a diagram showing an LED package, and (*b*) is an enlarged view of (*a*).

As shown in FIG. 1 (*a*), an LED package 1 as an example of a light emitting element according to this embodiment comprises an LED element 10 as an example of a luminous body, and a case 20 for fixing and wiring the LED element 10.

The LED element 10 is a conventionally known element. Although not shown in detail in the drawings, the LED element 10 includes an n-type cladding layer, a p-type cladding layer, and an active layer. In FIG. 1 (*a*), an upper surface is a light emission surface 18, from which light is emitted to the outside.

The LED element 10 is fixed to the case 20. The case 20 is provided with wiring 21, 22 for supplying electric power to the LED element 10.

As shown in FIG. 1 (*b*), the LED element 10 includes a light emitting portion 1 which is a main body portion for emitting light, a recording material layer 12 formed on the light emitting portion 11 (a light emission surface 18), and a barrier layer 13 in this order.

The recording material layer 12 is a layer in which a recessed portion can be formed by application of strong light, through thermal deformation of material caused by heat produced by conversion of the light applied, that is, a layer of a so-called heat mode type recording material. This type of recording material is hitherto used generally in the recording layer of optical discs or the like; for example, recording materials such as cyanine-based, phthalocyanine-based, quinone-based, squarylium-based, azulenium-based, thiol complex salt-based, and merocyanine-based recording materials may be used for our purpose.

The recording material layer 12 according to the present invention may preferably be of a dye type, which contains a dye as a recording substance.

Therefore, the recording substance contained in the recording material layer 12 may be selected from dyes or other organic compounds. It is to be understood that the material which may be used for the recording material layer 12 is not limited to organic matter; that is, an inorganic material or a composite material of organic and inorganic materials may also be employed. With the organic materials, however, the coating process for forming a film can be performed easily by spin coating, and a material having a lower transition temperature is readily available; thus, the organic materials may be preferable. Further, amongst various organic materials, dyes whose light absorption can be controlled by varying their molecular design may be preferable.

Preferred examples of material for use in the recording material layer 12 may include methine dyes (cyanine dyes, hemicyanine dyes, styryl dyes, oxonol dyes, merocyanine dyes, etc.), large ring dyes (phthalocyanine dyes, naphthalocyanine dyes, porphyrin dyes, etc.), azo dyes (including an azo-metal chelate dye), arylidene dyes, complex dyes, coumarin dyes, azole derivatives, triazine derivatives, 1-aminobutadiene derivatives, cinnamic acid derivatives, quinophthalone dyes, etc.

Of these, a dye-type recording material 12 in which information can be recorded only once with a laser beam may be preferable. This is because such an organic recording material can be dissolved in a solvent and formed into a film by spin coating or spray coating, and therefore excels in productivity. This dye-type recording material 12 may preferably contain a dye having absorption in the range of recording wavelengths. Particularly, the upper limit of an extinction coefficient k indicating the amount of light absorption may preferably be 10 or less, more preferably 5 or less, still more preferably 3 or less, and most preferably 1 or less. This is because too high extinction coefficient k would prevent light incident on one side of the recording material layer 12 from reaching or passing through the opposite side, thus rendering the holes formed in the recording material layer 12 uneven. On the other hand, the lower limit of the extinction coefficient k may preferably be 0.0001 or more, more preferably 0.001 or more, and still more preferably 0.1 or more. This is because too low extinction coefficient k would reduce the amount of light absorption, which would require higher laser power and reduce the production speed.

It is to be understood, as described above, that the recording material layer 12 needs to have absorption of light in the range of recording wavelengths; with this in view, the selection of an appropriate dye and/or alteration of its structure may be made in accordance with the wavelength of the laser beam produced by the laser light source.

For example, in the case where the oscillation wavelength of the laser beam emitted from the laser light source is around 780 nm, it is advantageous to select dyes such as pentamechine cyanine dyes, heptamechine oxonol dyes, pentamethine oxonol dyes, phthalocyanine dyes, and naphthalocyanine dyes.

In the case where the oscillation wavelength of the laser beam emitted from the laser light source is around 660 nm, it is advantageous to select dyes such as trimechine cyanine dyes, pentamethine oxonol dyes, azo dyes, azo-metal complex dyes, and pyrromethene complex dyes.

Further, in the case where the oscillation wavelength of the laser beam emitted from the laser light source is around 405 nm, it is advantageous to select dyes such as monomechine cyanine dyes, monomechine oxonol dyes, zero-mechine merocyanine dyes, phthalocyanine dyes, azo dyes, azo-metal complex dyes, porphyrin dyes, arylidene dyes, complex dyes, coumarin dyes, azole derivatives, triazine derivatives, benzotriazole derivatives, 1-aminobutadiene derivatives, and quinophthalone dyes.

Examples of preferred compounds for use in the recording material layer 12 (i.e., as a recording layer compound) are shown below in the cases where the oscillation wavelength of the laser beam emitted from the laser light source is around 780 nm (near-infrared range of laser wavelengths), around 660 nm (visible-light range of laser wavelengths, particularly, red-color range of laser wavelengths), and around 405 nm (near-ultraviolet range of laser wavelengths), respectively. Compounds given by (I-1) to (I-10) in the following chemical formulae 1, 2 are suitable in the case where the oscillation wavelength of the laser beam is around 780 nm. Compounds given by formulae (II-1) to (II-8) in the chemical formulae 3, 4 are suitable in the case where the oscillation wavelength of the laser beam is around 660 nm, and compounds given by (III-1) to (III-14) in the chemical formulae 5, 6 and a compound given in the chemical formula 7 are suitable in the case where the oscillation wavelength of the laser beam is around 405 nm. It is to be understood that the present invention is not limited to the case where these compounds are used as the recording layer compound.

Examples of Recording Layer Compound in the Case of Oscillation Wavelength Around 780 nm

[Chem. 1]

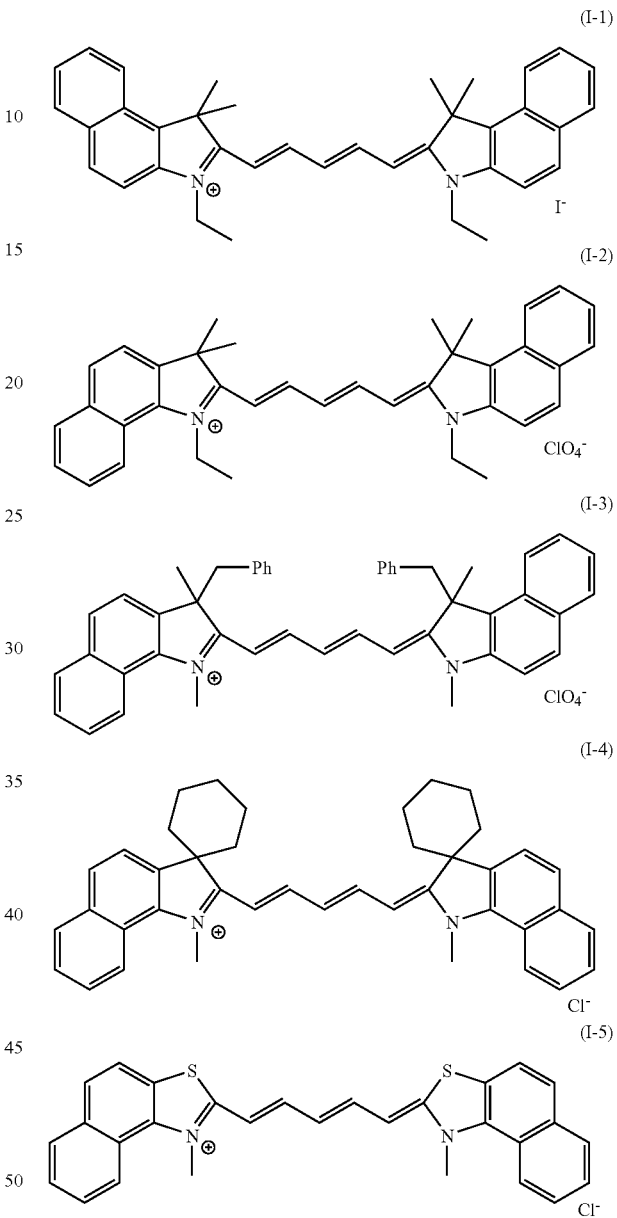

Examples of Recording Layer Compound in the Case of Oscillation Wavelength Around 780 nm

[Chem. 2]

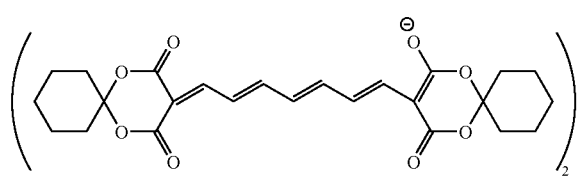

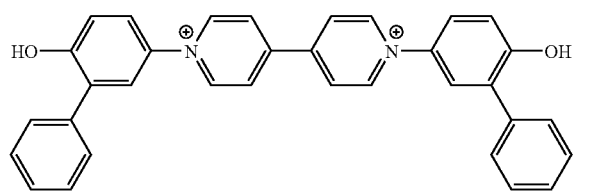

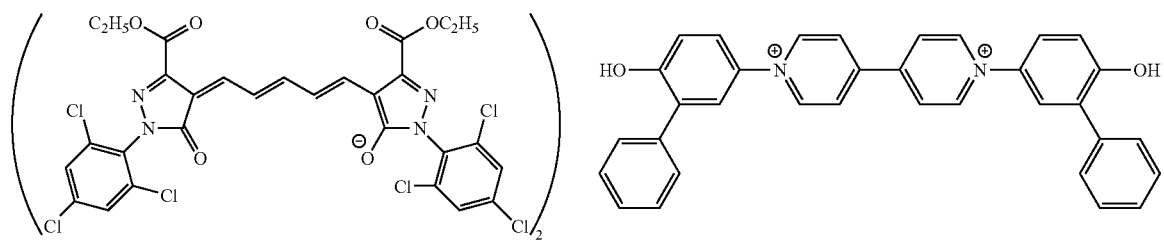
(I-7)
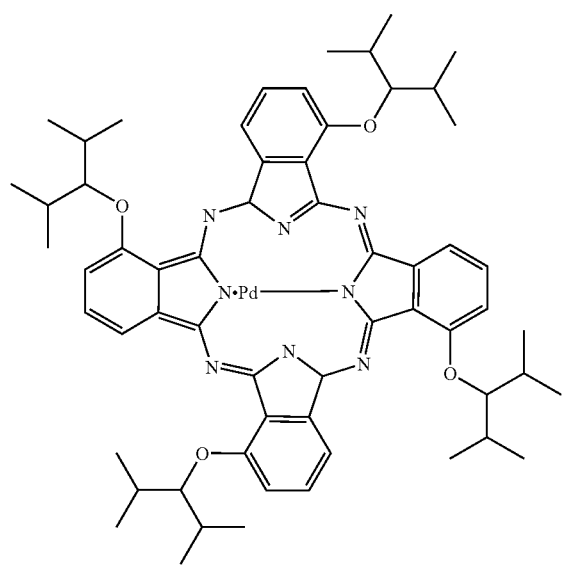
(I-8)
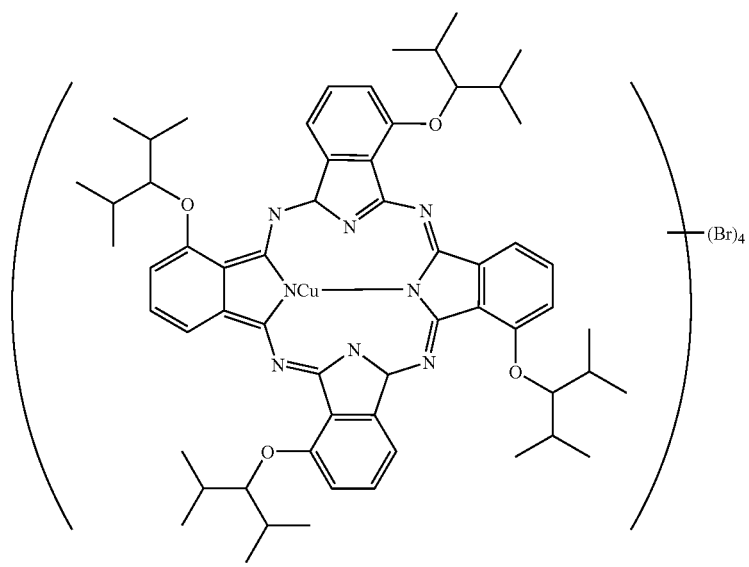
(I-9)

-continued
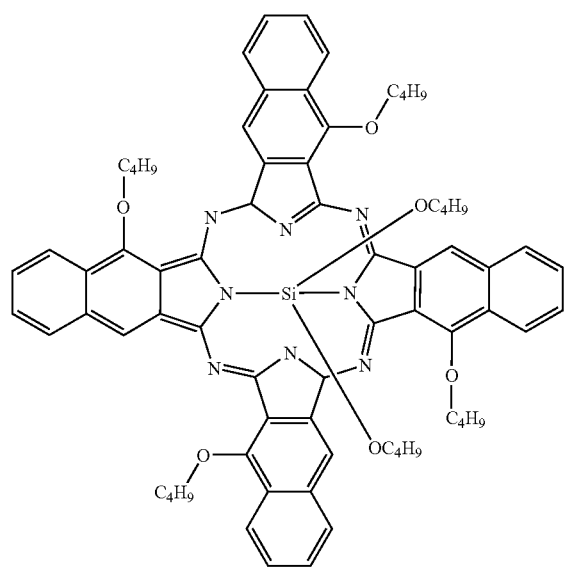
(I-10)
Examples of Recording Layer Compound in the Case of Oscillation Wavelength Around 660 nm
[Chem. 3]
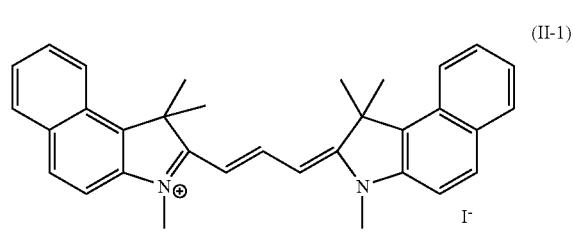
(II-1)
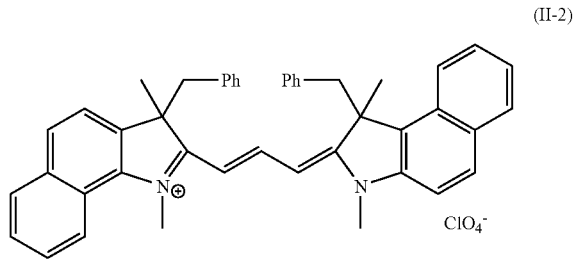
(II-2)
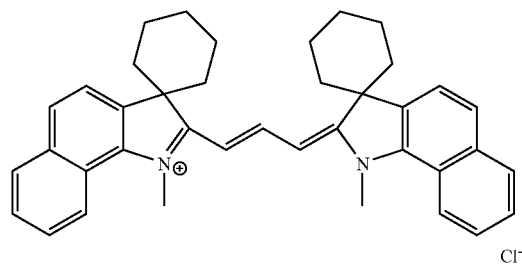
(II-3)
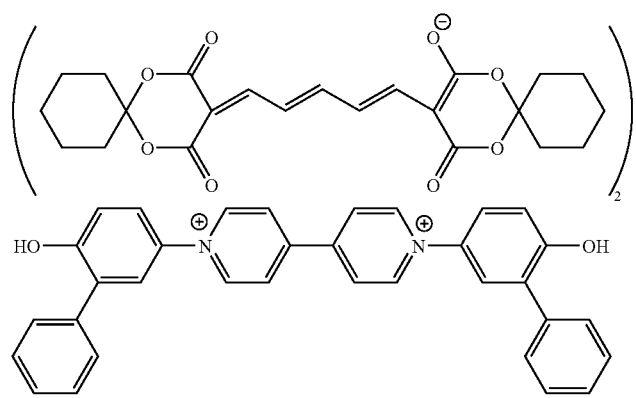
(II-4)

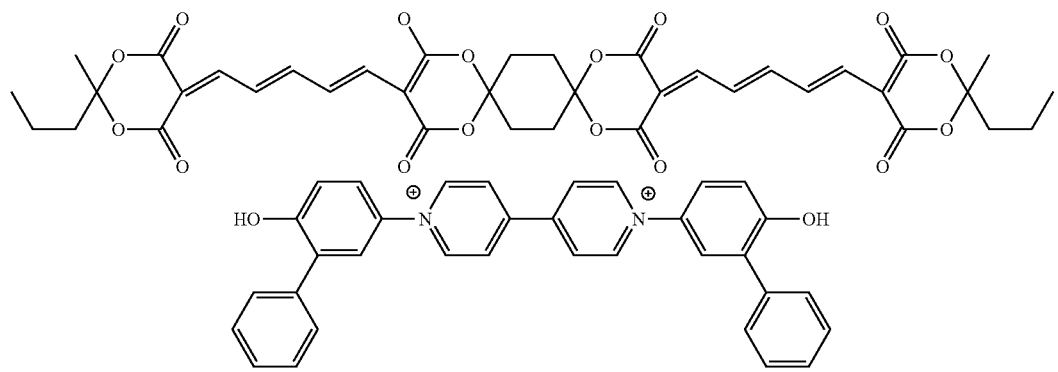
(II-5)
Examples of Recording Layer Compound in the Case of Oscillation Wavelength Around 660 nm
Examples of Recording Layer Compound in the Case of Oscillation Wavelength Around 405 nm
[Chem. 4]
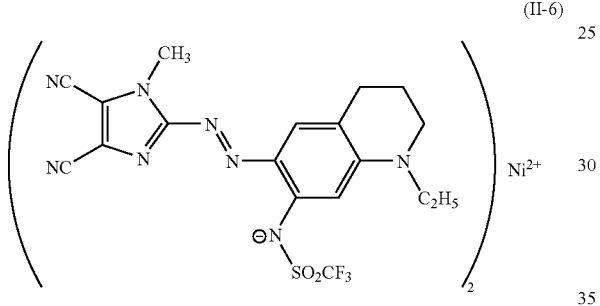
(II-6)
[Chem. 5]
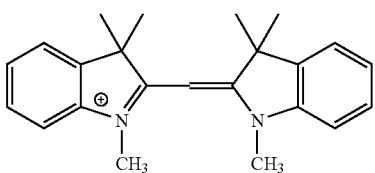
(III-1)
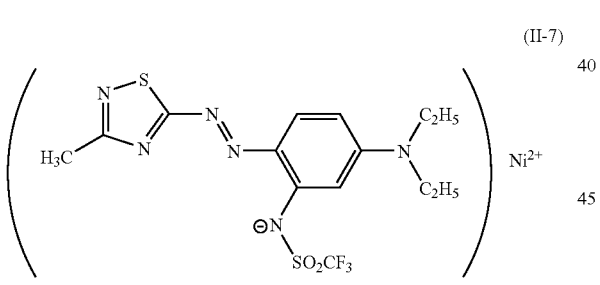
(II-7)
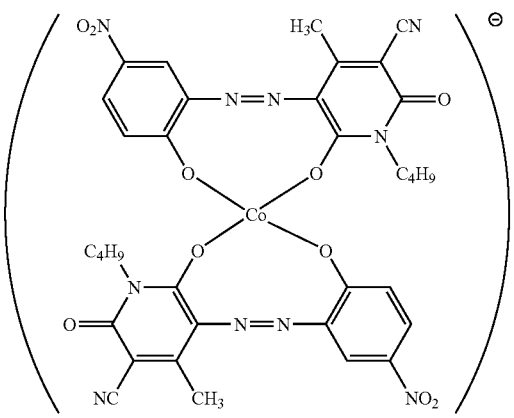
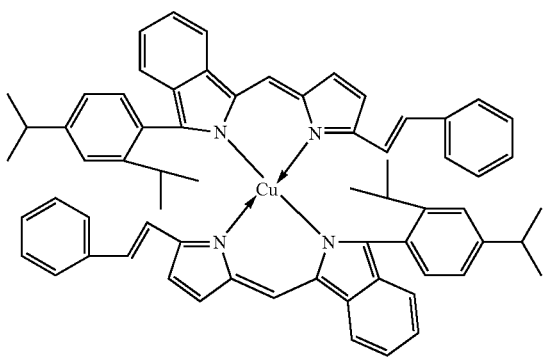
(II-8)
(III-2)

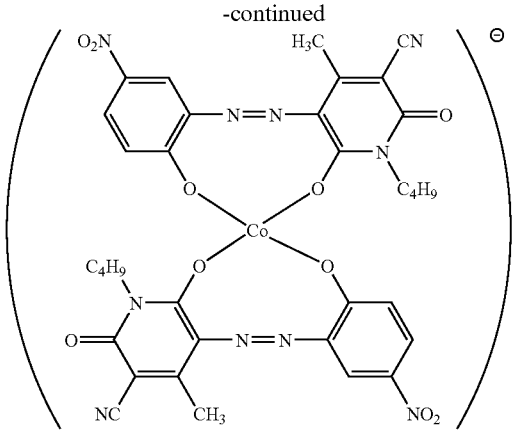
(III-3)
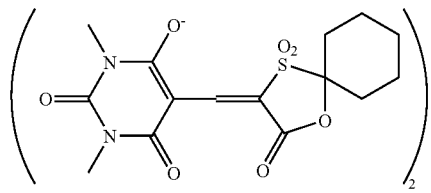
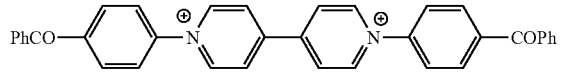
(III-4)
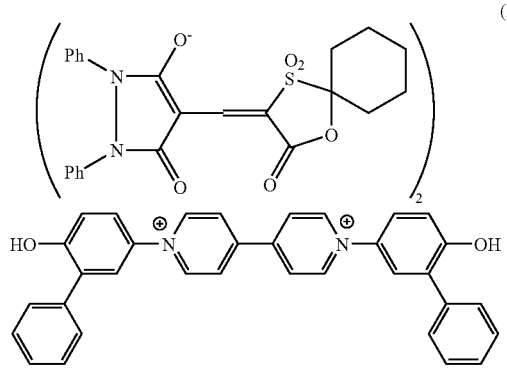
(III-5)
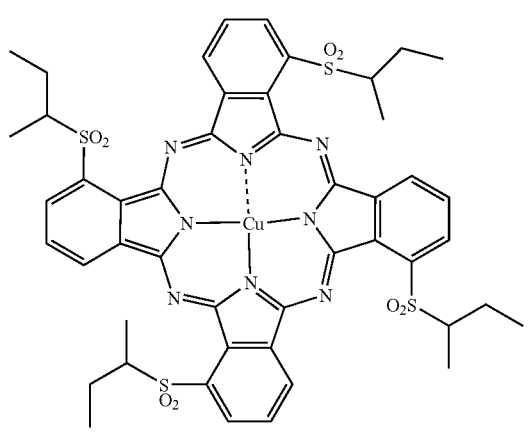
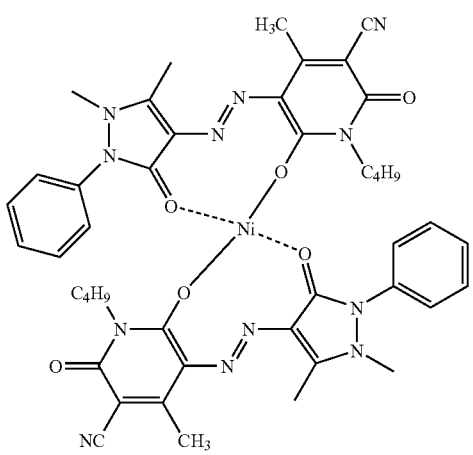
(III-6)
Examples of Recording Layer Compound in the Case of Oscillation Wavelength Around 405 nm
[Chem. 6]
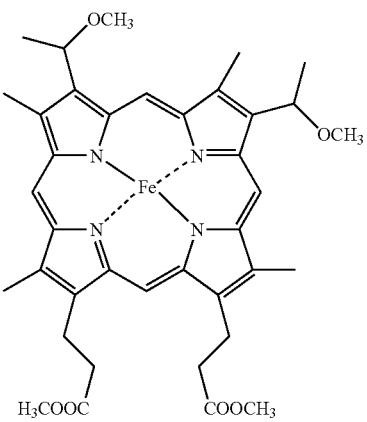
(III-7)
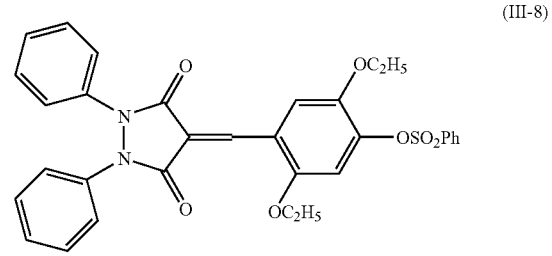
(III-8)
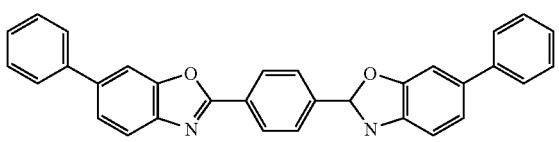
(III-9)

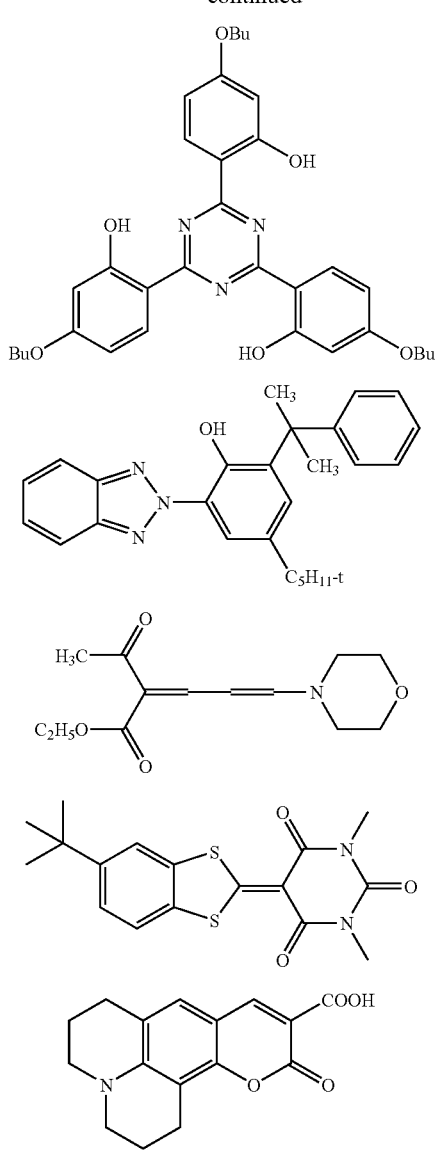

(III-10)
(III-11)
(III-12)
(III-13)
(III-14)

Examples of Recording Layer Compound in the Case of Oscillation Wavelength Around 405 nm

[Chem. 7]

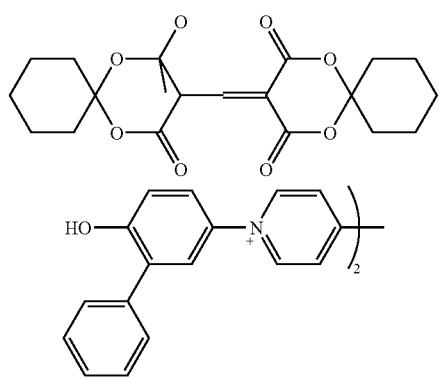

Dyes described in Japanese Laid-open Patent Applications, Publication (JP-A) Nos. 4-74690, 8-127174, 11-53758, 11-334204, 11-334205, 11-334206, 11-334207, 2000-43423, 2000-108513, and 2000-158818 can also preferably be used.

The dye-type recording material layer 12 may be formed by dissolving a dye in an adequate solvent along with a binding agent to prepare a coating liquid, then applying the coating liquid on a substrate to form a coating film, and thereafter drying the resulting coating film. In this process, the temperature of a surface on which the coating liquid is applied may preferably be in the range of 10-40 degrees centigrade. More preferably, the lower limit thereof may be 15 degrees centigrade or higher, still more preferably 20 degrees centigrade or higher, and particularly preferably 23 degrees centigrade or higher. Meanwhile, the upper limit of the surface may be more preferably 35 degrees centigrade or lower, still more preferably 30 degrees centigrade or lower, and particularly preferably 27 degrees centigrade or lower. When the temperature of the coated surface is in the above ranges, uneven application of the coating and coating failure can be prevented, so that a thickness of the coating film can be made uniform.

Each of the upper and lower limits mentioned above may be arbitrarily combined with each other.

Here, the recording material layer 12 may be either mono-layered or multi-layered. In the case of the recording material layer 12 having a multi-layered configuration, the coating step is repeated plural times.

A concentration of the dye in the coating liquid is generally in the range of 0.01-30 mass percent, preferably in the range of 0.1-20 mass percent, more preferably in the range of 0.5-10 mass percent, and most preferably in the range of 0.5-3 mass percent.

Examples of the solvent for the coating liquid include: esters such as butyl acetate, ethyl lactate and cellosolve acetate; ketones such as methyl ethyl ketone, cyclohexanone, and methyl isobutyl ketone; chlorinated hydrocarbons such as dichloromethane, 1,2-dichloroethane and chloroform; amides such as dimethylformamide; hydrocarbons such as methylcyclohexane; ethers such as tetrahydrofuran, ethyl ether, and dioxane; alcohols such as ethanol, n-propanol, isopropanol, n-butanol, and diacetone alcohol; fluorinated solvents such as 2,2,3,3-tetrafluoropropanol; and glycol ethers such as ethylene glycol monomethyl ether, ethylene glycol monoethyl ether and propylene glycol monomethyl ether.

Taking the solubility of the dye used in the solvents into consideration, the above solvents may be used singly or in a combination of two or more kinds thereof. Various kinds of additives such as an antioxidant, a UV absorbent, a plasticizer and a lubricant may be added in the coating liquid depending on the purpose.

Coating methods such as spray method, spin coating method, dip method, roll coat method, blade coat method, doctor roll method, doctor blade method, and screen printing method are applicable. Of these methods, the spin coat method is preferable in terms of its excellent productivity and easy controllability of the film thickness.

In order to form the recording material layer 12 (recording layer compound) better by the spin coating method, the dye may be dissolved preferably in the organic solvent in the range of 0.01-30 weight percent, and more preferably in the range of 0.1-20 weight percent. It is particularly preferable that the dye be dissolved in tetrafluoropropanol in the range of 0.5-10 weight percent. It is also preferable that the thermal decomposition temperature of the recording layer compound be in the range of 150-500 degrees centigrade, and more preferably in the range of 200-400 degrees centigrade.

The temperature of the coating liquid at the time of coating may preferably be in the range of 23-50 degrees centigrade, more preferably in the range of 24-40 degrees centigrade, and particularly preferably in the range of 25-30 degrees centigrade.

In the spin coating method, the substrate is rotated at the outset, and a coating liquid is discharged onto the rotating substrate. The rotation speed at this step may be preferably in the range of 20-700 rpm, more preferably in the range of 50-500 rpm, and still more preferably in the range of 100-400 rpm. The rotation speed at the subsequent drying step may preferably be in the range of 500-10,000 rpm, more preferably in the range of 1,000-7,000 rpm, and still more preferably in the range of 2,000-5,000 rpm.

In the case where the coating liquid contains a binding agent, examples of the binding agent include natural organic polymers such as gelatin, cellulose derivatives, dextran, rosin and rubber; and synthetic organic polymers including hydrocarbonic resins such as polyethylene, polypropylene, polystyrene and polyisobutylene, vinyl resins such as polyvinylchloride, polyvinylidene chloride and polyvinylchloride-polyvinyl acetate copolymers, acrylic resins such as polymethyl acrylate and polymethyl methacrylate, and initial condensates of thermosetting resins such as polyvinyl alcohol, chlorinated polyethylene, epoxy resin, butyral resin, rubber derivatives and phenol formaldehyde resin. In the case where the binding agent is used together as a material for the recording material layer 12, the amount of the binding agent used is generally in the range of 0.01-50 times the amount of dye (mass ratio), and preferably in the range of 0.1-5 times the amount of dye (mass ratio).

In order to increase the lightfastness of the recording material layer 12, various antifading agents may be contained in the recording material layer 12.

In general, a singlet oxygen quencher is used for the antifading agent. As examples of such singlet oxygen quencher, those described in published documents such as patent specifications hitherto known in the art can be used.

Specific examples of such patent specifications include: Japanese Laid-open Patent Applications, Publication (JP-A) Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, and 4-25492; Japanese Examined Patent Applications, Publication (JP-B) Nos. 1-38680 and 6-26028; German Patent No. 350399; and Nippon Kagaku Kaishi, October (1992), p. 1141. The use amount of the antifading agent such as a singlet oxygen quencher relative to the amount of dye is generally in the range of 0.1-50 mass percent, preferably in the range of 0.5-45 mass percent, more preferably in the range of 3-40 mass percent, and particularly preferably in the range of 5-25 mass percent.

The above description refers to a solvent coating method adopted in the case where the recording material layer 12 is a dye-type recording layer; however, the recording material layer 12 may also be formed by any of other film-forming methods such as evaporation, sputtering and CVD, which may be selected depending on the physical properties of the recording material to be used therein.

The dye to be used is such that a light absorptance thereof at the wavelength of a laser beam used in the processing of the recessed portions 15 which will be described later is higher than those at the other wavelengths. It is particularly preferable that the light absorptance at the wavelength of the laser beam in the processing be higher than the emission wavelength of a light emitting element such as the LED element 10.

The wavelength at which the dye exhibits the peak absorption may not necessarily fall within the range of the wavelengths of visible light, but may be within the range of the wavelengths of the ultraviolet or infrared region.

Particularly, when the refractive index of the material constituting the light emission surface of the light emitting element is high, it is preferable that the recording material layer 12 and the barrier layer 13, which constitute the recessed portions 15, have higher refractive index.

The dye has a high refractive index range of wavelengths on a long-wave side of the peak wavelength of the absorption wavelengths, and this range of wavelengths may preferably conform to the emission wavelength of the light emitting element. To that end, the wavelengths $\lambda a$ at which the dye has absorption may preferably be shorter than the center wavelength $\lambda c$ of the light emitting element ($\lambda a < \lambda c$). The difference between $\lambda a$ and $\lambda c$ may preferably be 10 nm or more, more preferably 25 nm or more, and still more preferably 50 nm or more. If $\lambda a$ and $\lambda c$ are too approximate, the range of absorption wavelengths of the dye overlaps the center wavelength $\lambda c$ of the light emitting element, so that light is absorbed. Further, the upper limit of the difference between $\lambda a$ and $\lambda c$ may preferably be 500 nm or less, more preferably 300 nm or less, and still more preferably 200 nm or less. If the $\lambda a$ and $\lambda c$ are too widely different, the refractive index would be too small for the light emitted from the light emitting element.

The wavelength $\lambda w$ of the laser beam to be emitted to form the recessed portions 15 may preferably satisfy a relationship as given by $\lambda a < \lambda w$. This relationship, if satisfied, allows the amount of light absorbed in the dye to fall into an adequate range, so that the recording efficiency can be improved and a fine pattern of pits and projections can be formed. Further, the relationship of $\lambda w < \lambda c$ may preferably be satisfied. Since $\lambda w$ should be a wavelength such that light having this wavelength is absorbed by the dye, the light emitted from the light emitting element, which has the center wavelength $\lambda c$ located on the long-wave side of the wavelength $\lambda w$, would not be absorbed by the dye, and thus transmissivity is improved with the result that the luminous efficiency is improved.

In view of the above, it is most preferable that the relation of $\lambda a < \lambda w < \lambda c$ is satisfied.

The wavelength $\lambda w$ of the laser beam to be emitted to form the recessed portions 15 may be any wavelength as long as a sufficiently high laser power is obtained. For example, in the case where a dye is used for the recording material layer 12, the wavelength may preferably be 1,000 nm or less, such as 193 nm, 210 nm, 266 nm, 365 nm, 405 nm, 488 nm, 532 nm, 633 nm, 650 nm, 680 nm, 780 nm, and 830 nm.

The laser beam may be of any known type such as gas laser, solid-state laser, and semiconductor laser. However, in order to simplify the optical system, the use of the solid-state laser or the semiconductor laser is preferable. The laser beam may be a continuous light beam or pulsed light beam. However, it is preferable to use a laser beam whose emission intervals can be changed freely. For example, the use of a semiconductor laser is preferable. In the case where the laser beam is not directly on-off keyed, it is preferable that the laser beam is modulated using an external modulation element.

In order to increase the processing speed, a higher laser power is preferable. However, the higher the laser power, the higher scanning speed (speed for scanning the recording material layer 12 with the laser beam; for example, rotation speed of the optical disc drive which will be described later)

is required. For this reason, taking the upper limit value of the scanning speed into consideration, the upper limit value of the laser power is preferably 100 W, more preferably 10 W, and still more preferably 5 W, and most preferably 1 W. Meanwhile, the lower limit value of the laser power is preferably 0.1 mW, more preferably 0.5 mW, and still more preferably 1 mW.

It is preferable that the laser beam has a narrow range of oscillation wavelength and a high coherency, and that the laser beam can be condensed to a spot size which is as small as the wavelength of the laser beam. Further, as a recording strategy (i.e., optical pulse illumination conditions for appropriately forming recessed portions 15), it is preferable that the strategy used for optical discs is employed. To be more specific, conditions required for the manufacture of optical discs, such as recording speed, peak value of the illuminating laser beam, and pulse width, are preferably used.

It is preferable that the recording material layer 12 has a thickness set, in accordance with the depth of the recessed portion 15 which will be described later.

This thickness may be set appropriately, for example, in the range of 1-10,000 nm. The lower limit of the thickness is preferably 10 nm or more, and more preferably 30 nm or more. This is because, if the thickness is too thin, a recessed portion 15 formed is so shallow that optical effects can not be obtained. Further, in the case where the recording material layer 12 is used as an etching mask as will be described later, a desired effect as an etching mask can hardly be achieved. Meanwhile, the upper limit of the thickness is preferably 1,000 nm or less, and more preferably 500 nm or less. This is because, if the thickness is too thick, the required laser power is increased, the difficulty comes up in deeply making a hole, and the processing speed is reduced.

Further, it is preferable that the thickness t of the recording material layer 12 and the diameter d of the recessed portion 15 has the following relationship. Namely, the upper limit value of the thickness t of the recording material layer 12 preferably takes a value to satisfy the relationship as given by $t<10d$, more preferably takes a value to satisfy $t<5d$, and still more preferably to satisfy $t<3d$. The lower limit value of the thickness of the recording material layer 12 preferably takes a value to satisfy the relationship as given by $t>d/100$, more preferably takes a value to satisfy $t>d/10$, and still more preferably to satisfy $t>d/5$. The reason for determining the upper limit value and the lower limit value of the thickness t of the recording material layer 12 in accordance with the diameter d of the recessed portion 15 is the same as those described above.

It is preferable that the upper limit value of the diameter d of the recessed portion is 100,000 nm or less, more preferably 10,000 nm or less, and still more preferably 1,000 nm or less. It is preferable that the lower limit value thereof is 10 nm or more, preferably 50 nm or more, and still more preferably 100 nm or more.

To form the recording material layer 12, a substance which will act as a recording material is dissolved or dispersed in an appropriate solvent to prepare a coating liquid. Thereafter, the surface of the light emitting surface 18 is coated with this coating liquid by a coating method such as spin coating, dip coating, and extrusion coating, so that the recording material layer 12 can be formed.

The barrier layer 13, which his optionally provided, is formed to protect the recording material layer 12 from damage under an impact, etc. Any material may be used to form the barrier layer 13 as long as it is a transparent material. Preferably, the barrier layer 13 is made of polycarbonate, cellulose triacetate, etc., and more preferably, the barrier layer 13 is made of a material whose moisture absorptivity is 5% or less at 23° C.50% RH. Oxides and sulfides such as $SiO_2$, ZnS, and GaO may also be used.

The teem "transparent" means that the material allows light emitted from the LED element 10 to pass therethrough (transmissivity: 90% or more).

The barrier layer 13 is formed as follows. Firstly, light curing resin which forms an adhesive layer is dissolved in an appropriate solvent to prepare a coating liquid. This coating liquid is then coated on the recording material layer 12 at a predetermined temperature to form a coating film, and a cellulose triacetate film (TAC film) obtained, for example, by plastic extrusion processing is laminated on the coating film. Finally, the laminated TAC film is illuminated with light so that the coating film is cured to provide the barrier layer 13. It is preferable that the TAC film contains an ultraviolet light absorber. The thickness of the barrier layer 13 is in the range of 0.01-0.2 mm, preferably in the range of 0.03-0.1 mm, and more preferably in the range of 0.05-0.095 mm.

A plurality of recessed portions 15 are formed in the recording material layer 12 and the barrier layer 13 at intervals. The recessed portion 15 is formed by illuminating a portion of the recording material layer 12 and the barrier layer 13 with condensed light to thereby cause deformation (including deformation effected by dissipation or vanishment) at the illuminated portion. It is preferable that the recessed portions 15 are formed in positions arranged densely in an area of the light emission surface 18 from which the light is emitted.

The principle on which the recessed portion 15 is formed is as follows.

When the recording material layer 12 (recording layer compound) is illuminated with a laser beam having a wavelength such that the material has light absorption (i.e., the wavelength of light to be absorbed in the material), the laser beam is absorbed by the recording material layer 12, and then converted into heat to thereby increase the temperature at an illuminated portion of the recording material layer 12. This causes the recording material layer 12 to undergo chemical or/and physical change(s) such as softening, liquefaction, vaporization, sublimation and decomposition. The thus-changed material moves or/and dissipates, and the recessed portion 15 is formed. It is to be understood that the barrier layer 13 is a very thin layer, and thus the barrier layer 13 moves or/and dissipates together with the recording material layer 12 moving or/and dissipating. When the recessed portion 15 is formed in this way, part of the chemically or/and physically changed recording material layer 12 is left and remains as debris around the recessed portion 15.

As a method for forming recessed portions 15, any hitherto known method for forming pits in a write-once optical or WORM disc is applicable. To be more specific, for example, a reflected light intensity of the laser beam that varies in accordance with the pit size is detected, and the output of the laser is regulated so that the reflected light intensity becomes constant to thereby form uniform sized pits. This method will be described in detail later.

It is preferable that vaporization, sublimation or decomposition of the recording material layer 12 (recording layer compound) as described above occurs at a high rate of change, that is, precipitously. To be more specific, the weight decrease rate obtained by a thermogravimetry differential thermal analysis (TG-DTA) instrument during vaporization, sublimation or decomposition of the recording layer compound is preferably 5% or more, more preferably 10% or more, and still more preferably 20% or more. Further, the slope of weight decrease (weight decrease rate per elevated temperature of 1° C.) obtained by the thermogravimetry differential thermal analysis (TG-DTA) instrument during vaporization, sublimation or decomposition of the recording layer compound is preferably 0.1%/° C. or more, more preferably 0.2%/° C. or more, and still more preferably 0.4%/° C.

The upper limit value of the transition temperature of the chemical change or/and the physical change such as softening, liquefaction, vaporization, sublimation, and decomposition is preferably 2,000° C. or less, more preferably 1,000° C. or less, and still more preferably 500° C. or less. This is because if the transition temperature is too high, a higher laser power is required. The lower limit value of the transition temperature is preferably 50° C. or more, more preferably 100° C. or more, and still more preferably 150° C. or more. This is because if the transition temperature is too low, the temperature gradient relative to that of the environment is so small that the shape of an edge of a hole is not formed clearly.

As shown in FIG. 2 (a), the recessed portions 15 may form a dotted pattern with each of the dots being arranged in a grid pattern. Further, as shown in FIG. 2 (b), the recessed portions 15 may be formed with a series of interspaced narrow grooves. Although not shown in the drawings, the recessed portions may be formed with continuous grooves, instead.

The pitch P of two adjacent recessed portions 15 is in the range of 0.01-100 times the center wavelength λc of light emitted from the LED element 10 which is the light emitting element.

The pitch P of the recessed portions 15 is preferably in the range of 0.05-20 times the center wavelength λc, more preferably in the range of 0.1-5 times the center wavelength λc, and most preferably in the range of 0.2-2 times the center wavelength λc. To be more specific, the lower limit value of the pitch P is preferably equal to or greater than 0.01 times the center wavelength λc, more preferably equal to or greater than 0.05 times the center wavelength λc, and further more preferably equal to or greater than 0.1 times the center wavelength λc, and most preferably equal to or greater than 0.2 times the center wavelength λc. Further, the upper limit value of the pitch P is preferably equal to or smaller than 100 times the center wavelength λc, more preferably equal to or smaller than 20 times the center wavelength λc, and further more preferably equal to or smaller than 5 times the center wavelength λc, and most preferably equal to or smaller than 2 times the center wavelength λc.

The recessed portion 15 has a diameter or a width of the groove in the range of 0.005-25 times the center wavelength λc, preferably in the range of 0.025-10 times the center wavelength λc, more preferably in the range of 0.05-2.5 times the center wavelength λc, and most preferably in the range of 0.25-2 times the center wavelength λc.

Herein, the diameter of the recessed portion 15 or the width of the groove of the recessed portion 15 indicates the size of the recessed portion 15 at a half of the depth thereof, which is a so-called half-value width.

The diameter of the recessed portion 15 or the width of the groove of the recessed portion 15 may appropriately be set in the above ranges. However, the diameter or the width is preferably adjusted in accordance with the size of the pitch P so that the refractive index becomes macroscopically gradually smaller as it is away from the light emission surface 18. In other words, it is preferable that if the pitch P is greater, the recessed portion 15 has a larger diameter or a larger width of the groove, and that if the pitch P is smaller, the recessed portion 15 has a smaller diameter or a smaller width of the groove. In this point of view, it is preferable that the diameter or the width of the groove is sized to be approximately a half of the pitch P. For example, the diameter or the width of the groove is preferably in the range of 20-80% of the pitch P, more preferably in the range of 30-70% of the pitch P, and most preferable in the range of 40-60% of the pitch P.

The depth of the recessed portion 15 is preferably in the range of 0.01-20 times the center wavelength λc, more preferably in the range of 0.05-10 times the center wavelength λc, further more preferably in the range of 0.1-5 times the center wavelength λc, and most preferably in the range of 0.2-2 times the center wavelength λc. The desirable upper limit value of the depth is 20,000 nm or less, preferably 10,000 nm or less, and more preferably 5,000 nm or less. The desirable lower limit value of the depth is 1 nm or more, preferably 5 nm or more, and more preferably 10 nm or more.

The method of manufacturing the LED package 1 configured as above will be described below with reference to FIGS. 4 (a)-(c).

Figure 4:
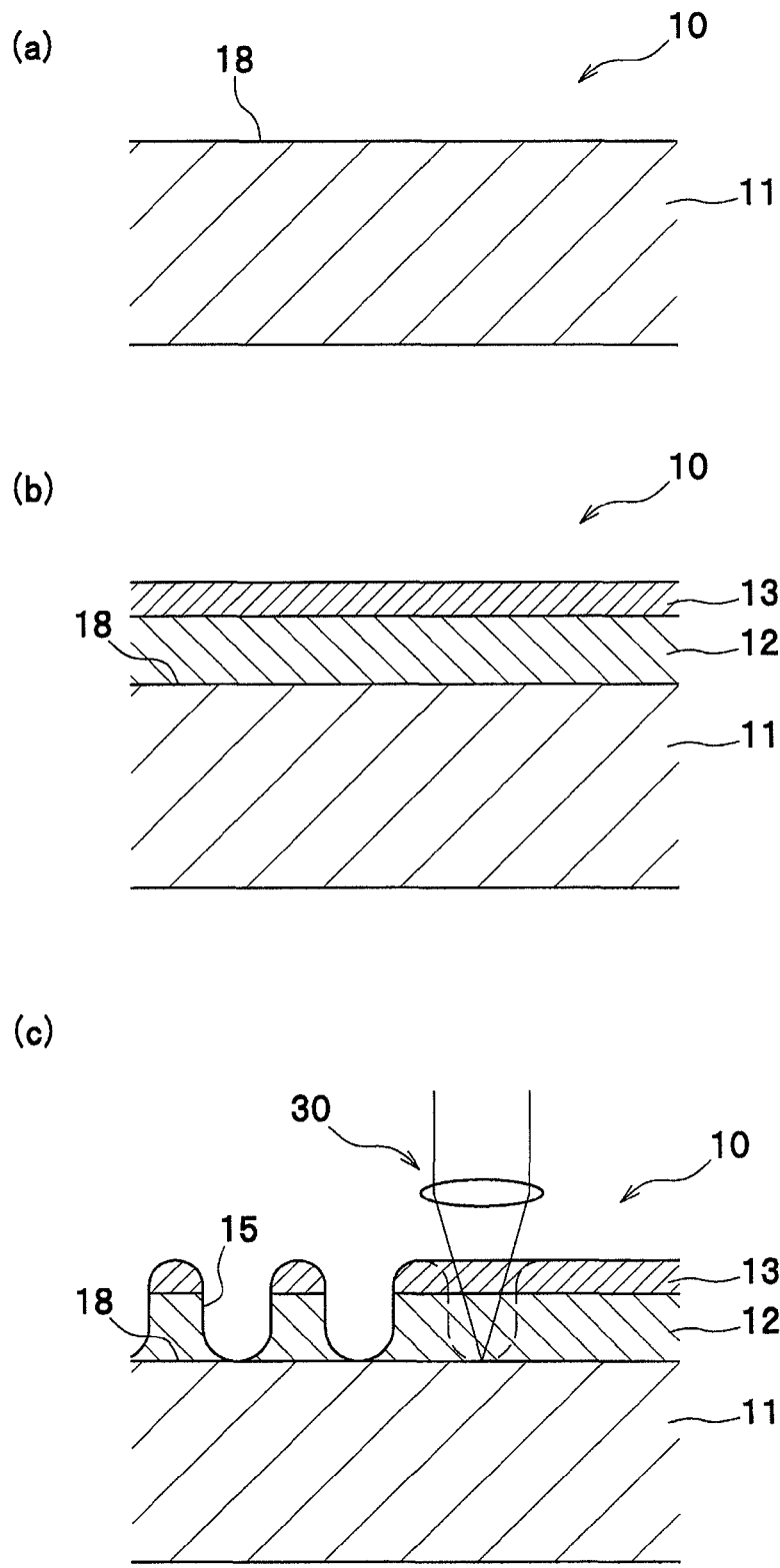
FIGS. 4 (*a*)-(*c*) are diagrams showing a process for manufacturing an LED package.

As shown in FIG. 4 (a), a light emitting portion 1 as a main body of the LED element 10 is prepared, wherein the light emitting portion 1 is fabricated by a method known in the art. The light emitting portion 1 to be prepared here preferably has a size which does not correspond to a single LED element 10 but correspond to a plurality of LED elements 10 (i.e., the light emitting portion 1 may be a wafer on which a plurality of LED elements 10 can be formed). In this configuration, after the wafer (light emitting portion 1) is processed to have pits and projections formed thereon, and is cleaned as will be described later, each of a plurality of light emitting portions 1 corresponding to the plurality of LED elements 10 will be separated from each other to obtain a plurality of LED elements 10.

After the light emitting portion 1 is prepared, a recording material layer 12 and a barrier layer 13 are formed in this sequence as shown in FIG. 4 (b).

Figure 5:
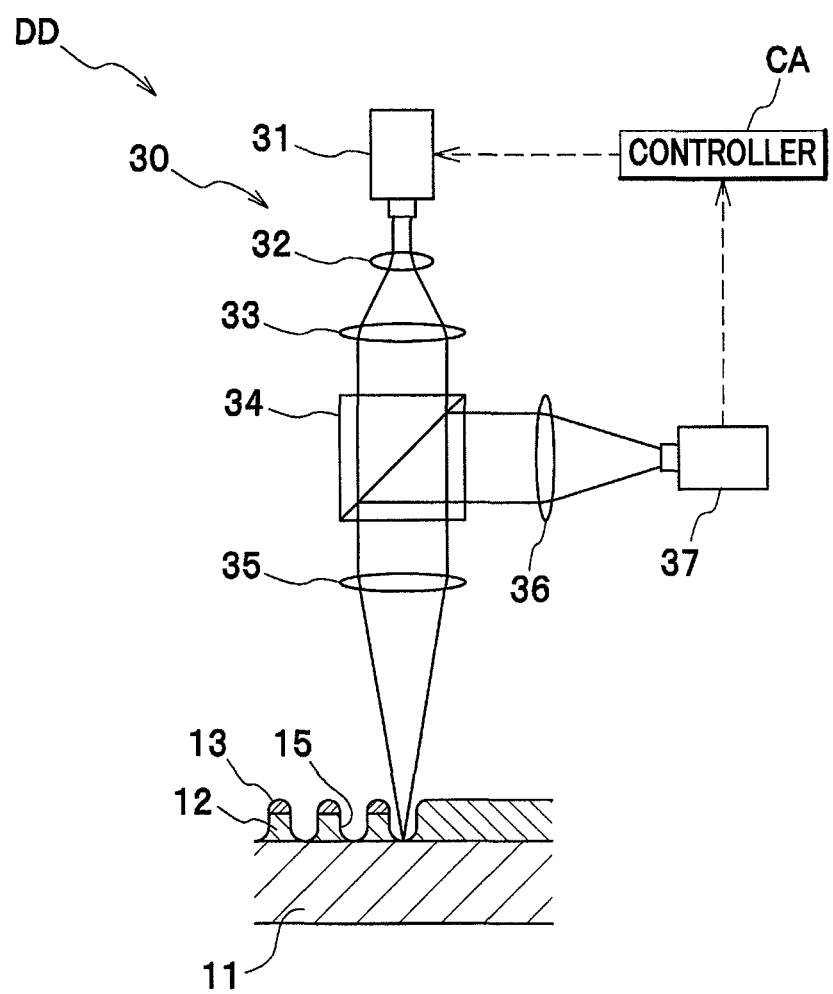

Next, recessed portions 15 are formed. As an apparatus for forming the recessed portions 15, an optical disc drive DD as shown in FIG. 5 may be used. Specifically, the optical disc drive DD includes an optical system 30 for illuminating the recording material layer 12 and the barrier layer 13 with condensed light, and a controller CA. The optical disc drive DD further include, though not shown in the drawings, a spindle for rotating the light emitting portion 1 (the main body of the LED element 10), and other components.

The optical disc 30 includes a laser light source 31, a first lens 32, a second lens 33, a semitransparent mirror 34, a third lens 35, a fourth lens 36 and a detector 37.

The laser light source 31 is a device configured to emit a laser beam, and its output is regulated by the controller CA.

The first lens 32 is an element configured to enlarge a beam diameter of the laser beam emitted from the laser light source 31, and located downstream (downstream in the direction of travel of the laser beam) of the laser light source 31.

The second lens 33 is an element configured to convert the light beam having an enlarged diameter into a parallel beam, and located downstream of the first lens 32.

The semitransparent mirror 34 is located downstream of the second lens 33, and configured to transmit a laser beam emitted from the laser light source 31 and to reflect the laser beam, which has come back from the opposite direction, into a predetermined direction (the direction substantially perpendicular to an optical-axis direction of the laser beam).

The third lens 35 is an element configured to condense the laser beam, which has passed through the semitransparent mirror 34, and located downstream of the semitransparent mirror 34.

The fourth mirror 36 is an element configured to condense the laser beam, which has been reflected off the semitransparent mirror 34, and located on the light path through which the laser beam reflected off the semitransparent mirror 34 travels.

The detector 37 is located downstream of the fourth lens 36, and has a function of detecting a light quantity of the laser beam condensed by the fourth lens 36. The light quantity thus detected by the detector 37 is output to the controller CA. As the detector 37, for example, a photodiode, a segmented type photodiode, etc. may be adopted.

The controller CA includes a CPU, a ROM, a RAM, a communication device and other components (not shown) of hardware known in the art, and in the present embodiment, in particular, configured to exercise control of regulating the output of the laser light source 31 based on the light quantity detected by the detector 37, such that the light quantity becomes a predetermined value. To be more specific, the controller CA executes the control process in accordance with the flowchart shown in FIG. 6.

Hereinbelow, the process of regulating the output of the laser light source 31 which is to be executed by the controller CA will be described with reference to FIG. 6.

Figure 6:
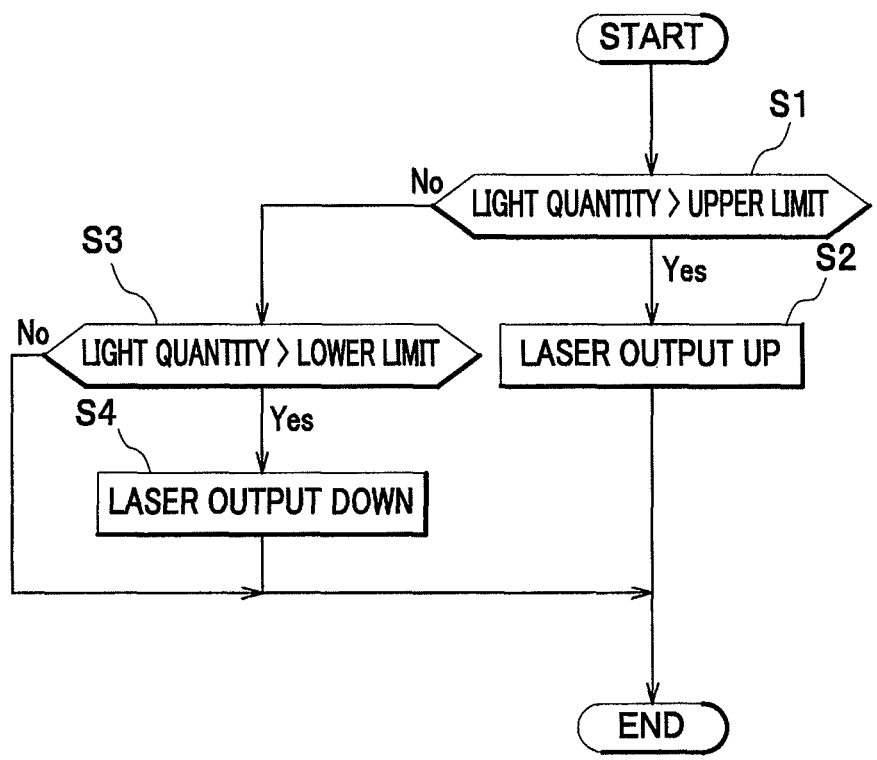
FIG. 6 is a flowchart showing a laser light source output regulation method to be exercised by a controller.

As shown in FIG. 6, when the controller CA receives information on a light quantity outputted from the detector 37 (START), the controller CA determines whether or not the light quantity is higher than an upper limit value of a predetermined range (S1). If it is determined in step S1 that the light quantity is higher than the upper limit value (Yes), then the controller CA determines that the recessed portion 15 formed is smaller than a desired size, and increases the output of the laser light source 31 by a predetermined amount (S2).

If it is determined in step S1 that the light quantity is not higher than the upper limit value (No), then the controller CA determines whether or not the light quantity is lower than a lower limit value of the predetermined range ($S_3$). If it is determined in step S3 that the light quantity is lower than the lower limit value (Yes), then the controller CA determines that the recessed portion 15 formed is larger than the desired size, and lowers the output of the laser light source 31 by a predetermined amount ($S_4$). Subsequent to the steps S4 and S2, or if determination in step S3 results in No (i.e., if the recessed portion 15 formed is sized as desired), the controller CA brings the operation in this flowchart to the end (END).

With the optical disc drive DD described above, a wafer in which an LED element 10 is formed in a matrix pattern is formed in the same shape as that of the optical disc or it is attached to a dummy optical disc, so that the wafer is set on the spindle (not shown) in the disc drive DD. The recording material layer 12 is then illuminated with a laser beam whose initial output value is set, in accordance with the material of the recording material layer 12, at an output value appropriate to deform the material. Further, pulse signals or continuous signals are input to the laser light source 31 such that the illumination pattern of the laser beam conforms with the dotted or grooved pattern of FIG. 2 (a) or (b). As seen in FIG. 3 (b), the duty cycle of the laser beam emitted in a predetermined period T, which is defined by τ/T where τ indicates emission time and T indicates period, is preferably set smaller than the duty cycle of the actually formed recessed portions 15 (i.e., length d of a recessed portion 15 in the laser beam scanning direction versus pitch P; see FIG. 3 (a)). It is noted that an oblong-shaped recessed portion 15 can be formed by moving the circle-shaped laser beam shown in FIG. 3 (a) at a predetermined speed during the emission time τ. For example, assuming that the length d of the recessed portion 15 is 50 while the pitch P of the recessed portion 15 is 100, it is preferable that laser beam is emitted at a duty cycle less than 50%. In this instance, the upper limit value of the duty cycle of the laser beam is preferably less than 50%, more preferably less than 40%, and still more preferably less than 35%. Meanwhile, the lower limit value of the duty cycle is preferably equal to or higher than 1%, more preferably equal to or higher than 5%, and still more preferably equal to or higher than 10%. It is possible to accurately form the recessed portion 15 having a predetermined pitch by setting the duty cycle as described above.

Further, a known focusing method used in the optical disc drive may be also adopted. For example, by the use of an astigmatic method, the laser beam can be readily focused on the surface of the light emission surface 18 irrespective of a warpage or bent of the light emitting portion 1.

Accordingly, as shown in FIG. 4 (c), the LED element 10 is illuminated with the laser beam from the light emission surface 18 side which laser beam is condensed using an optical system 30 of the disc drive DD. In this operation, the laser beam is emitted not only as recording light for forming recessed portions 15 in the recording material layer 12 or the like, but also as inspection light for inspecting a size (quality) of the recessed portions 15. To be more specific, the laser beam serves as recording light until completion of the formation of the recessed portion 15, and serves as inspection light after the completion of the formation of the recessed portion 15. Since the recessed portion 15 is formed at a central portion of the condensed incident laser beam where the temperature is higher, the inspection light with which the recessed portion 15 is illuminated after the recessed portion has been formed strikes an inner surface of the recessed portion 15 and a surface of the recording material layer 12 around the recessed portion 15.

When the laser beam emitted as the inspection light is reflected off the recessed portion 15 (including an area around the recessed portion 15), the light quantity of the reflected light is detected by the detector 37. To be more specific, the reflected light is detected by the detector 37 at a time when a predetermined period of time has elapsed after a condensed laser beam to enter the recording material layer 12 and the barrier layer 13 in which no recessed portion 15 is formed is emitted, that is, at a time when it is assumed that the formation of the recessed portion 15 is completed. It is to be understood that the aforementioned "predetermined period of time" which elapses before the formation of the recessed portion 15 is completed may be determined beforehand by preliminary experiments, simulations, or the like.

If the light quantity detected by the detector 37 is higher than the upper limit value, then the output of the laser light source 31 is increased for formation of the next recessed portion 15, and the recessed portion 15 is formed with an increased laser light. On the other hand, if the light quantity detected by the detector 37 is lower than the lower limit value, then the output of the laser light source 31 is lowered for formation of the next recessed portion 15, and the recessed portion 15 is formed with a reduced laser light. Similar to the operation executed to record information on an optical recording disc, the light emitting portion 1 is rotated, and the optical system 30 is moved in a radial direction of the light emitting portion, so that the recessed portions 15 can be formed in the entire light emission surface 18 with adjustments being made to the output of the laser light source 31.

The recessed portions 15 are formed under the processing conditions as follow.

Numerical aperture NA of the optical system 30 is set with a lower limit thereof being preferably 0.4 or more, more preferably 0.5 or more, and still more preferably 0.6 or more. Meanwhile, the upper limit of the numerical aperture NA is preferably 2 or less, more preferably 1 or less, and still more preferably 0.9 or less. If the numerical aperture NA is too small, a fine processing cannot be performed. If the numerical aperture NA is too large, a margin is decreased with respect to an angle at a time of recording.

The wavelength of the optical system 30 may be set, for example, to 405±30 nm, 532±30 nm, 650±30 nm, and 780±30 nm. These wavelengths are preferable to obtain a higher output. It is to be understood that a shorter wavelength is preferable because the shorter the wavelength, the finer the processing can be performed.

The output of the optical system 30 is set with a lower limit thereof being 0.1 mW or more, preferably 1 mW or more, more preferably 5 mW or more, and still more preferably 20 mW or more. The upper limit of the output of the optical system 30 is 1,000 mW or less, preferably 500 mW or less, and more preferably 200 mW or less. This is because if the output is too low, the processing takes too much time while if the output is too high, the durability of parts constituting the optical system 30 becomes deteriorated.

The linear velocity for relatively moving the optical system 30 with respect to the recording material layer 12 is set with a lower limit of the linear velocity being 0.1 m/s or higher, preferably 1 m/s or higher, more preferably 5 m/s or higher, and still more preferably 20 m/s or higher. Meanwhile, the upper limit of the linear velocity is 500 m/s or lower, preferably 200 m/s or lower, more preferably 100 m/s or lower, and still more preferably 50 m/s or lower. This is because if the linear velocity is too high, it becomes difficult to execute processing with increased accuracy, whereas if the linear velocity is too low, the processing requires too much time and could not be performed enough to obtain an appropriate shape.

As a specific example of an optical disc drive DD including the optical system 30, NE0500 manufactured by Pulstec Industrial Co., Ltd. can be used.

After the recessed portions 15 are formed in the recording material layer 12 and the barrier layer 13 as described above, a cleaning step as shown in FIGS. 7 (a)-(c) is performed. In FIG. 7 (a), the recessed portions 15 are illustrated in an exaggerated manner for the purpose of better understanding.

After the recessed portions 15 are formed, the LED element 10 is removed from the optical disc drive DD, and set in a device 40 for spin coating as shown in FIG. 7 (a). Then, the device 40 is actuated; that is, while the LED element 10 is being turned along its surface (light emission surface 18), a liquid L which is inactive to the light emitting portion 1, the recording material layer 12 and the barrier layer 13 is dropped on a spot on the LED element 10 which spot is located on a device 40 spindle RA side. Thus, as shown in FIGS. 7 (b), (c), the liquid L dropped on the light emission surface 18 of the LED element 10 moves from the spindle RA side (see FIG. 7 (a)) outward by the centrifugal force, and debris D adhered to the recording material layer 12 and other components are washed away to the outside by this moving liquid L.

The liquid L which contains at least one of hydrocarbon solvents, fluorinated solvents and water may preferably be adopted. Examples of the hydrocarbon solvents may include, for example, octane and nonane. Examples of fluorinated solvents may include, for example, a hydrofluoroether (manufactured by 3M Company).

Examples of the device 40 for spin coating may include, for example, MS-A100 (Mikasa Co., Ltd.).

The period of time elapsing from the time at which the recessed portions 15 have been formed before starting the removal of debris D (spin coating) may be set preferably in the range of 0.1 second to 72 hours. The lower limit value of the period of time elapsing from the time at which the recessed portions 15 have been formed before starting the removal of debris D may be preferably 1 second or longer, more preferably 10 seconds or longer, and most preferably 100 seconds or longer. The lower limit value, if set as above, makes it possible to sufficiently cool the recording material layer 12 and other components in which the recessed portions 15 are formed, with the result that the disturbance of the shapes of the recessed portions 15 which would be generated by putting the liquid L on the high-temperature recording material layer 12 and other components can be suppressed. The upper limit value of the period of time elapsing from the time at which the recessed portions 15 have been formed before starting the removal of debris D may be preferably 24 hours or shorter, more preferably 1 hour or shorter, and most preferably 10 minutes or shorter. The upper limit value, if set as above, makes it possible to prevent the debris D from being fixed on the recording material layer 12 or other components due to a long period of time during which the debris D left unremoved, so that the debris D can be removed effectively by the liquid L.

The amount of the liquid L to be dropped may be preferably 0.5-20 cc, and more preferably 1-5 cc. The lower limit value, if set as above, makes it possible to wash away the debris D by the liquid L without fail; the upper limit value, if set as above, makes it possible to shorten a period of time for drying after removal of the debris.

After the debris D are washed away by the liquid L as described above, the rotation is continued for a predetermined period of time, and the liquid L having remained on the LED element 10 is all swept away, so that the LED element 10 is dried quickly.

Thereafter, though not shown in the drawings, the LED element 10 is fixed in the case 20, and necessary wirings are provided; in this way, the LED package 1 is manufactured.

The LED package 1 formed as described above has a fine pattern of pits and projections formed in the light emission surface 18 thereof, and thus the refractive index changes macroscopically and gradually in the vicinity of the light emission surface 18; therefore, it is possible to restrict light emitted from the light emission surface 18 from being reflected by the inner surface of the light emission surface 18. This can improve the luminous efficiency of the LED package 1.

As described above, the recording material layer 12 can be formed all at once in large quantities by means of coating, or like method, and thus the recessed portions 15 can be formed swiftly and inexpensively using an apparatus which is similar in structure to the conventionally known optical disc drive. Further, a known focusing method can be adopted so that the recessed portions 15 can be formed in a simple manner irrespective of a warpage of the material. This manufacturing process is very simple when compared with a method requiring a development step using a photoresist or a conventional complicated method including application of the material, baking, exposure, baking, and etching. Therefore, it is possible to simply form a fine pattern of pits and projections in the light emission surface of the light emitting element so as to improve the luminous efficiency.

Since the thermally deformable heat mode type recording material layer 12 is used to thereby form recessed portions 15 simply by emission of condensed laser beam, the processing quality can be swiftly assessed by application of inspection light (laser beam) to the recessed portions 15. Furthermore, the results of inspection of the processing quality thus detected can be provided as feedback for formation of the recessed portions 15, so that the occurrence of the defective portions can be reduced.

Since the light emitted from the laser light source 31 for the purpose of forming the recessed portions 15 can be utilized as inspection light, the system can be simplified and the cost can be reduced.

Since debris D adhered to the recording material layer 12 or other components are removed by the liquid L, a neat pattern of pits and projections (recessed portions 15) can be formed.

Since the liquid L is distributed evenly all over the entire surface of the LED element 10 by merely dropping the liquid L on the spindle-side spot of the LED element 10, the amount of the liquid L to be applied can be reduced. Moreover, since application of the liquid L all over the entire surface of the LED element 10 and the removal of debris adhered to the recording material layer 12 or other components are achieved at the same time by the rotation causing the liquid L to move, the cleaning time can be shortened.

Since the rotation is continued after debris D have been washed away from the recording material layer 12 or other components so as to perform the drying operation, the recording material layer 12 and other components can be dried more swiftly in comparison with the air-drying method where the rotation is stopped after debris have been washed away. Furthermore, since the present embodiment adopts the spin coating method as a method for application, the operations of application through drying can be carried out by the same device 40, with the result that the facilities can be simplified.

Second Embodiment

A method for manufacturing an optical element according to a second embodiment of the present invention will be described with reference to FIG. 8.

An optical element 10A is a member with a high transmissivity for light, and is closely-attached or adhered to the light emission surface of the light emitting element. For example, the optical element 10A is attached to the surface of the light emission surface 18 of the LED package 1 which has been exemplified in the first embodiment or to the surface of a fluorescent tube.

Figure 8:
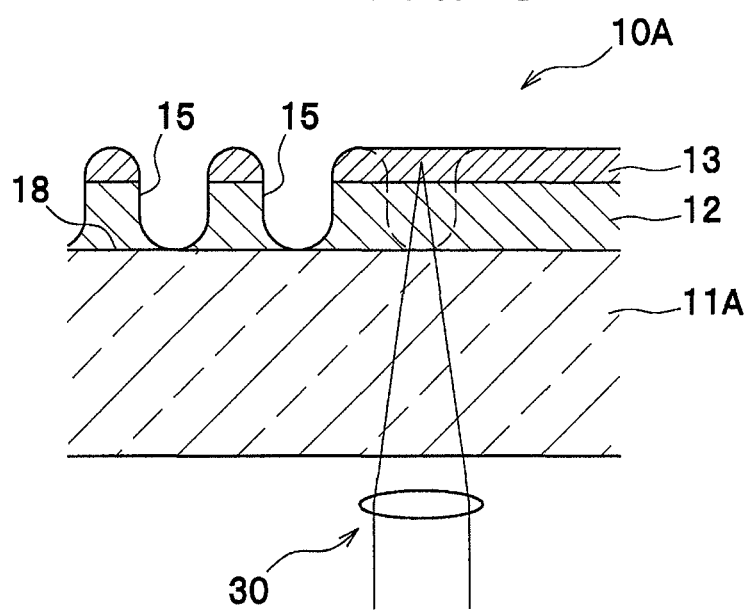
FIG. 8 is a diagram showing a method for manufacturing an optical element according to a second embodiment.

As shown in FIG. 8, the optical element 10A is configured such that a recording material layer 12 and a barrier layer 13 which are similar to those described in the first embodiment are formed on a transparent supporting member 11A and recessed portions 15 are formed.

The supporting member 11A may have a sufficient transmissivity (e.g., transmissivity of approximately 80% or more) with respect to light emitted from the light emitting element. The supporting member 11A is made of resin such as polycarbonate, or a glass material.

In order to form the recessed portions 15, the supporting member 11A is moved and a laser beam is condensed with its output being regulated as in the first embodiment so that the supporting member 11A is illuminated with a pulsed laser beam. In this instance, as shown in FIG. 8, the optical element 10A may be illuminated with the laser beam from the supporting member 11A side (opposite side of the recording material layer 12). In the case where the laser beam is emitted from the side opposite to the recording material layer 12, the laser beam source is advantageously free from being soiled by ejected material that is spewed out from the recording material layer 12 upon reaction with the laser beam.

After the recessed portions 15 are formed, debris D adhered to the recording material layer 12 or other components are removed by the cleaning method similar to that of the first embodiment.

The optical element 10A configured as above is attached to the surface of the light emission surface 18 of the LED package 1 or to the surface of the fluorescent tube, so that the luminous efficiency of these light emitting elements can be improved.

Third Embodiment

A method of manufacturing a light emitting element according to a third embodiment of the present invention will be described with reference to FIGS. 9 (*a*)-(*c*).

In the method for manufacturing an LED element 10 according to the third embodiment, recessed portions 15 are formed in the recording material layer 12 and the barrier layer 13 as shown in FIG. 9 (*a*) by the same process steps as described in the first embodiment (see FIGS. 4 and 7), and the recording layer material 12 and other components are cleaned by the liquid L. Thereafter, etching is performed while the recording material layer 12 and the barrier layer 13 in which the recessed portions 15 are formed are used as a mask, so that a plurality of holes 16 corresponding to the recessed portions 15 are formed in the light emission surface 18 as shown in FIG. 9 (*b*). Finally, as shown in FIG. 9 (*c*), the recording material layer 12 and the barrier layer 13 are removed using a predetermined stripping agent or the like, so that the light emission surface 18 with a fine pattern of pits and projections is exposed to view.

Various etching methods can be adopted, such as wet etching and dry etching. However, RIE is preferable because an etching gas tends to travel in a straight line so that fine patterning can be performed. Further, removal of the recording material layer 12 and the barrier layer 13 may be carried out by various methods including a dry process and a wet process.

As a specific example for the etching method and the removal method, for example, in the case where a layer including the light emission surface 18 of the light emitting portion 1 is made of glass, the recording material layer 12 contains dye, and the barrier layer 13 is made of an inorganic material layer, RIE using SF6 as an etching gas and a wet removal process using ethanol as a stripping agent may be adopted. Herein, the term "layer including the light emission surface" indicates any layer as long as it forms a surface boundary with respect to the external environment such as gas (e.g. air) and liquid (e.g. water) after manufacture of the LED element 10.

According to the manufacturing method in this third embodiment, since pits and projections are formed in the surface (light emission surface 18) itself of the LED element 10, it is possible to simply design a pattern of pits and projections without consideration of the refractive index difference between the LED element 10 and the recording material layer 12. According to this embodiment, a plurality of recessed portions 15 are formed using, for example, the focusing technique, in the recording material layer 12, which has been formed in advance on the surface of the LED element 10, so that a mask is reliably set in close contact with the surface of the LED element 10. Therefore, the manufacturing method according to this embodiment is free from a drawback of the conventional manufacturing method that a mask does not closely contact with the surface of the LED element 10 because of warpage or bent of the surface of the LED element 10. Therefore, the pattern of pits and projections can be formed easily.

Although some embodiments of present invention has been described, the present invention is not limited to these embodiments and various changes and modifications may be made where appropriate.

For example, in the above embodiments, the LED element is shown as an example of the light emitting element. However, the light emitting element is not limited to the LED element and may be any light emitting device such as a plasma display element, a laser, an SED element, a fluorescent tube, and an EL element.

In the respective embodiments described above, a recessed portion forming method according to the present invention is applied to the methods for manufacturing a light emitting element or an optical element. The present invention is not limited to these embodiments; the present invention may be applied to a method for manufacturing a pit-projection product. That is, as shown in FIGS. 10 (a) and (b), the present invention may be applied to a method for manufacturing an optically readable information recording medium (optical disc 50) as an example of the pit-projection product, by forming holes 16 as information on a substrate (base) 51 made of an inorganic substance and providing a protective layer 52 at a side of the substrate 51 on which the holes 16 are formed. To be more specific, a recording material layer 12 and a barrier layer 13 are formed on the substrate 51, and recessed portions 15 are formed by applying condensed light emitted with an output thereof being regulated, to the recording material layer 12 and other layer, by the same method as the method shown in FIG. 4. Subsequently, debris adhered onto the substrate 51 are cleaned by liquid by the same method as the method shown in FIG. 7. Thereafter, holes 16 corresponding to the recessed portions 15 are formed, using the recording material layer 12 and other layer as a mask, by the same method as the method shown in FIG. 9. In this way, the holes 16 can be neatly formed in the substrate 51.

Materials for the substrate 51 may preferably be selected from those containing Si or Al; for example, Si, $SiO_2$, $Al_2O_3$ and the like may be preferably adopted. Materials for the protective layer 52 may preferably be selected from inorganic materials such as $SiO_2$ or other inorganic oxides and $Si_3N_4$ or other inorganic nitrides, and organic materials such as UV curing resins, which may be adopted alone or in combination. For the purpose of extending the longevity of the optical disc 50, however, it would be desirable that the protective layer 52 also be formed from an inorganic material.

The pit-projection product is not limited to the optical disc 50, but includes semiconductors, flat panel displays (organic electro-luminescence, liquid crystal and plasma displays), SEDs (surface-conduction electron-emitter displays), circuit boards, masks for light exposure, semiconductors and packages thereof, interposers, printed boards, storage media, bio chips, and the like.

As means for mass production of pit-projection products having fine pits and projections formed densely, the nanoimprint technology has been a focus of study. The nanoimprint technology is a field of art in which a press work using a mold or die is applied to a nanoscale production, and refers to a nanoscale molding work technique in which a mold having fine pits and projections is pressed against a workpiece to impart a desired shape. With the nanoimprint technology, a pattern of several tens of nanometer width can be formed. Compared with the relevant working technique using an electron beam, the nanoimprint technology is advantageous in that molding work can be achieved at low cost and in large quantity. The above-described method using a heat mode resist material may be adopted for the method of forming fine pits and projections in a mold for use in the nanoimprint technology application.

In the above embodiments, the recording material layer 12 is directly provided on the light emission surface of the light emitting element or the optical element, or the surface of the substrate 51 which makes up an optical disc 50. However, another material may be interposed between the light emission surface or the surface and the recording material layer 12. In the case where a protective layer or/and a lens is provided on the surface of the LED element consisting of a semiconductor, the surface (surface boundary to air) of the protective layer or the lens becomes a light emission surface. In this instance, the recording material layer 12 and the recessed portions 15 may be provided on the surface of the protective layer or the surface of the lens.

In the above embodiments, the recessed portions 15 are formed using a laser beam. However, as long as light can be condensed to a required size, another kind of light, other than a monochromatic light such as a laser beam, may be used.

In order to obtain the minimum processing shape, the laser beam is emitted at infinitesimally small time intervals. The diameter of the recessed portion formed by the laser beam is preferably smaller than the wavelength of the laser beam. In other words, it is preferable that the laser beam is condensed to have a smaller spot diameter which satisfies the above relationship.

When a recessed portion 15 having a size larger than that of the minimum processing shape (hereinafter referred to as a "laser spot") is to be formed, laser spots may be connected to provide a larger recessed portion 15. It is noted that when the heat mode-type recording material layer 12 is illuminated with the laser beam, a change of the recording material occurs only in a part of the illuminated portion which reaches the transition temperature. Since the light intensity is greatest at the center in cross section of the laser beam and is gradually attenuated toward the edge of the laser beam, a minute hole (laser spot) having a diameter smaller than the spot diameter of the laser beam can be formed in the recording material layer 12. When a recessed portion 15 is formed with such fine holes arranged contiguously, the precision in the shape of the recessed portion 15 can be increased. On the other hand, if a photon mode-type material is employed, its reaction occurs in the whole illuminated portion where the laser beam strikes the surface thereof. Therefore, the size of the hole (i.e., laser spot) formed by a single pulse of the laser beam is relatively large, and the precision in its shape would be diminished in comparison with the cases where a heat mode-type material is employed. In this respect, the heat mode-type material as used in the present invention is preferable.

In the above-described embodiments, the barrier layer 13 is formed on the recording material layer 12. However, the present invention is not limited to this configuration, and the barrier layer 13 may not be provided, as shown in FIG. 11. Especially, if the recording material layer 12 is used as an etching mask as in the third embodiment or as in the embodiment shown in FIG. 10, it may be preferable that the barrier layer 13 be omitted.

According to the third embodiment described above, holes 16 are formed in the surface of the LED element 10. However, the present invention is not limited to this configuration, and holes may be formed in the surface of the optical element 10A (surface of the supporting member 11A) as described in the second embodiment by employing the recording material layer 12 or other layer as an etching mask.

In the third embodiment described above or the embodiment shown in FIG. 10, the recording material layer 12 and other layer are formed, as an etching mask, directly on the surface in which the holes 16 are to be formed (i.e., the light emission surface 18 or the surface of the substrate 51), but the present invention is not limited to this configuration. For example, if the recording material layer 12 and other layer are easily stripped by an etching gas, a mask layer 17 which can be subjected to etching by an etching gas substantially insusceptible to the recording material layer 12 and other layer may be provided, as shown in FIG. 12 (*a*), between the light emission surface 18 and the recording material layer 12. It is to be understood that FIG. 12 exemplifies one embodiment in which holes 16 are formed in the light emission surface 18, but a mask layer 17 may be provided similarly in another embodiment in which holes 16 are formed in the surface of the substrate 51.

According to this configuration, first, as in the first embodiment, recessed portions 15 are formed by a laser beam in the recording material layer 12 and the barrier layer 13, and the recording material layer 12 and other layer are cleaned by a liquid L (see FIG. 12 (*a*)). Next, as shown in FIG. 12 (*b*), the mask layer 17 is subjected to etching by a first etching gas to form through holes 17*a* corresponding to the recessed portions 15, in the mask layer 17. In this step, since a particular type of gas such that the recording material layer 12 and the barrier layer 13 are not stripped thereby is selected as the first etching gas, the mask layer 17 is subjected to etching with the recording material layer 12 and the barrier layer 22 serving as a mask.

Thereafter, as shown in FIG. 12 (*c*), the layer having the light emission surface 18 is subjected to etching by a second etching gas, so that holes 16 corresponding to the recessed portions 15 are formed on the light emission surface 18. During this process, the recording material layer 12 and the barrier layer 13 subjected to etching by the second etching gas are removed promptly; however, the light emission surface 18 can be etched successfully and excellently because the mask layer 17 serves as a mask. Thereafter, as shown in FIG. 12 (*d*), the mask layer 17 is removed by using a predetermined stripping agent or the like, so that the light emission surface 18 having pits and projections formed thereon is exposed to view.

As a specific example of the configuration shown in FIG. 12, a Si-containing Bi-Layer photoresist manufactured by TOKYO OHKA KOGYO CO., LTD. may be employed as the mask layer 17, SF6 may be used as the first etching gas, and $Cl_2$ may be used as the second etching gas, for example, in the case where the layer including the light emission surface 18 of the light emitting portion 1 is made of sapphire, the recording material layer 12 contains dye, and the barrier layer 13 is made of an inorganic material layer.

In the embodiments described above, a liquid L for cleaning is applied to the surface of the recording material layer 12 and other layer by spin coating, but the present invention is not limited to this configuration; any methods may be adopted which include, for example, spray coating, die coating, dip coating, etc. After the liquid is applied to the surface of the recording material layer 12 and other layer by any of these application methods, a workpiece (a product to be worked, having a recording material layer 12 or other layer) may be turned so as to move the liquid as in the embodiment described above, so that debris are washed away from the surface. In the dip coating, when a workpiece is dipped in a liquid, the workpiece may be moved in a liquid so that debris on the surface may be washed away.

In the embodiments described above, a workpiece is turned to dry the surface of the workpiece, but the present invention is not limited to this configuration; for example, the surface may be allowed to air-dry, or dried by blowing air with the help of a blower.

In the embodiments described above, the device for application of a liquid L and drying is provided in addition to the optical processing apparatus (optical disc drive DD), but the present invention is not limited to this configuration; the application of a liquid and drying may be performed on a turntable of the optical processing apparatus. However, the configuration, according to the above-described embodiments, in which the device for application and drying is provided in addition to the optical processing apparatus, is preferable in that a processing head (light emitting surface) of the optical processing apparatus is prevented from being soiled by the liquid.

Figure 13:
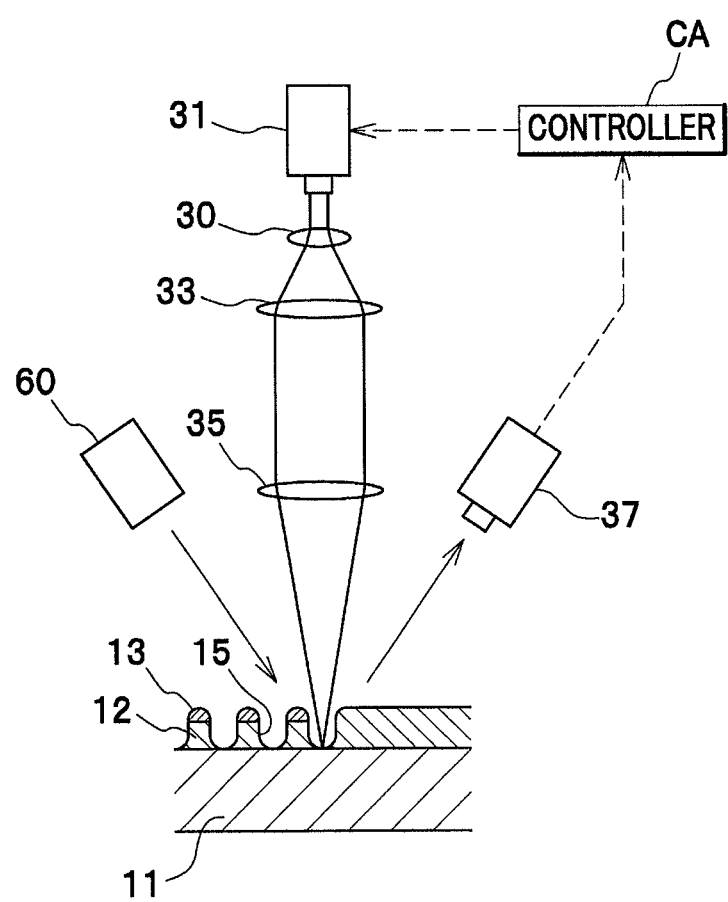
FIG. 13 is a diagram showing a modified example of an optical disc drive.

In the embodiments described above, a laser beam emitted from the laser light source 31 of the optical disc drive DD is utilized as inspection light, but the present invention is not limited to this configuration; as shown in FIG. 13, light emitted from another light source 60 different from the laser light source 31 may be utilized as the inspection light. Herein, FIG. 13 shows an embodiment in which part of the optical disc drive DD shown in FIG. 5 is modified, and thus the same elements as those shown in FIG. 5 are designated by the same reference characters, and a duplicate description will be omitted. To be more specific, in the configuration shown in FIG. 13, light emitted from the light source 60 is applied to the recessed portion 15, and the light quantity of light reflected therefrom is detected by the detector 37. From the result of detection, as well, the size of the recessed portion 15 can be determined based on the magnitude of the light quantity of the reflected light, and the result can be provided as feedback for processing of the recessed portions 15 so that the recessed portions 15 can be formed neatly. The light source 60 in FIG. 13 may be selected, for example, from a laser light source, LED (light-emitting diode) and the like.

In the embodiments described above, laser light that strikes a recessed portion 15 after the recessed portion 15 has been completely formed is utilized as the inspection light, and the quality of the recessed portion 15 of which formation has been completed is thereby assessed based on the inspection light reflected back from the same recessed portion 15, and the inspection result is provided as feedback for processing of a subsequent recessed portion 15; however, the present invention is not limited to this configuration. For example, a laser beam (e.g., recording light beam) which strikes a recessed portion 15 during the formation of the recessed portion 15 may be utilized also as inspection light, and the quality of the recessed portion 15 of which formation is in progress is assessed based on the inspection light reflected back from the same recessed portion 15, and the inspection result is provided as feedback for processing of the same recessed portion 15. To be more specific, for example, in the configuration shown in FIG. 13, when the recessed portion is foamed halfway by a laser beam from the laser light source 31, light is emitted from the light source 60 to the recessed portion 15 being formed, and light reflected back therefrom is detected by the detector 37. Then, the controller CA determines whether or not the light quantity of the reflected light is within a predetermined range, and thereby determines whether or not the size of the recessed portion being formed falls within a predetermined range, that is, whether or not the formation of the recessed portion 15 proceeds satisfactorily. If it is determined that the light quantity is out of the predetermined range, the output of the laser light source 31 is regulated as in the first embodiment. In this configuration, the inspection result of the recessed portion 15 being formed at present can be provided as feedback for processing the same recessed portion 15 being processed, and thus the occurrence of defective portions can be reduced more effectively.

In the embodiments described above, the light quantity of light reflected from the recessed portion 15 is detected, but the present invention is not limited to this configuration; the light quantity of light diffracted from the recessed portion 15 may be detected so that the output of the light source is regulated based on this light quantity. However, in this case, where a recessed portion 15 having a size larger than desired is formed when the light quantity of diffracted light is beyond a predetermined range (predetermined value) and a recessed portion having a size smaller than desired is formed when the light quantity is below the predetermined range, the process of step S2 should be interchanged with the process of step S4 in the flowchart of FIG. 6

In the embodiments described above, the magnitude of the light quantity is determined with reference to a predetermined range of values (predetermined range between an upper limit value and a lower limit value) adopted as threshold values, but the present invention is not limited to this configuration; that is, a threshold may be one value.

In the embodiments described above, the semitransparent mirror 34 is provided to reflect a laser beam reflected off a recessed portion 15, to the detector, but the present invention is not limited to this configuration; a polarized beam splitter may be provided, instead. In this alternative configuration, optics such as retardation plate known in the art may be provided where appropriate.

In the embodiments described above, when the quantity of the reflected light falls out of a predetermined range, only the output of the laser light source 31 is regulated, but the present invention is not limited to this configuration; an additional configuration may be adopted such that when the quantity of the reflected light falls out of the predetermined range, the position of the recessed portion formed (the recessed portion to which inspection light is applied) is recorded as quality information in a storage device each time when occasion arises. To be more specific, for example, if the quantity of the reflected light is equal to or lower than the half of the normal reflection light quantity, the portion processed at this time can be considered to be defective, and thus the position as recorded in the storage device can be utilized to locate a defective portion. In this way, for example, when a substrate having a plurality of recessed portions formed is separated into a plurality of pieces afterwards to fabricate smaller sized parts such as chips, defective parts may be removed based on the position information on the defective portion recorded, so that the quality of the products can be improved. Determination whether or not the portion is defective may not be made only based on the absolute value of the light quantity but may be made based additionally on the reflectivity indicated by the ratio of the detected light quantity to the normal light quantity and the length (specifically, the time required for processing that length) of the recessed portion from which inspection light is reflected with that reflectivity. For example, a method may be adopted such that if the reflectivity determined with the normal reflectivity being 1 becomes 0.3 or lower, it is determined unreservedly that the relevant portion is to be rejected, and if the reflectivity becomes 0.5 or lower and the reflectivity has continued to be 0.5 or lower for 5 μm or longer (i.e., a period of time required for processing the portion corresponding to 5 μm has elapsed), it is determined that the relevant portion is to be rejected.

EXAMPLE

One example implemented with which the advantageous effects of the present invention have been confirmed will be described below.

In the implementation example, a dye-containing layer (recording material layer) having a thickness of 100 nm was formed on a disc-shaped substrate (supporting member), and recessed portions were formed in a radius range of 25 mm to 40 mm of the substrate, with adjustments being made to the output of the laser beam, sequentially from a radially inner side at a radial pitch of 0.1 mm and at a circumferential pitch of 1 μm. After the recessed portions were formed, the surface of the dye-containing layer was cleaned, and pits and projections were formed in the substrate by dry etching.

Details of each layer were as follows.
Substrate
  Material: Silicon
  Thickness: 0.5 mm
  Outer diameter: 101.6 mm (4 inch)
  Inner diameter: 15 mm
Dye-Containing Layer (Recording Material Layer)

2 g of the dye-containing material given by the following formula was dissolved in 100 ml of TFP (tetrafluoropropanol) solvent, and the resulting solution was spin coated. In this spin-coating process carried out with a dispense-start rotation speed of 500 rpm and a dispense-end rotation speed of 1,000 rpm, a coating liquid was dispensed onto the inner-radius area of the substrate, and the rotation speed was gradually increased to 2,200 rpm. The refractive index n of the dye-containing material was 1.986 and the extinction coefficient k of the dye-containing material was 0.0418.

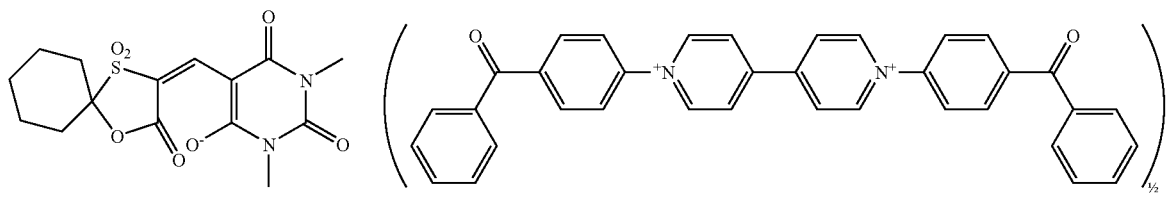

In the above optical recording medium, fine recessed portions were formed from the dye-containing layer side using DDU1000 (wavelength: 405 nm, NA: 0.65) manufactured by Pulstec Industrial Co., Ltd., in which a spherical aberration corrector plate is provided.

Conditions for forming the recessed portions were as follows.
  Initial laser output: 2.5 mW
  Linear velocity: 5 m/s
  Recording signal: Square wave of 5 MHz After the recessed portions were formed, a detector provided in the aforementioned device (DDU1000) is used to detect reflected light quantity, which is converted into reflectivity in a controller, and a comparison was made between the detected reflectivity and the normal reflectivity "1" stored in advance in a storage device. Here, the conversion from the reflected light quantity into the reflectivity was carried out by calculating the ratio of detected reflected light quantity to the normal value which was obtained as a light quantity of reflected light detected when a recessed portion having a normal size is formed in the dye-containing layer by a laser beam at the laser output of 2.5 mW. Based upon the results of comparison, control was exercised such that each time when the reflectivity lowered by 0.1, the laser output was increased by 0.1 mW, and each time when the reflectivity increased by 0.1, the laser output was lowered by 0.1 mW.

With the aforementioned control being exercised, recessed portions were formed from the inner radius side with the laser output of 2.5 mW; then, in the radius range of not shorter than 25 mm and shorter than 30 mm, the detected reflectivity became "1", and thus the processing for the recessed portion was carried out without regulating the laser output. Thereafter, in the position at the radius of 30 mm, the reflectivity became "0.9", and thus the laser output was lowered to 2.4 mW, which made the reflectivity back to "1". Further, in the position at the radius of 35 mm, the reflectivity became "0.9" again, and thus the laser output was lowered to 2.3 mW, which made the reflectivity back to "1". Thereafter, recessed portions were formed to the position at the radius of 40 mm with the laser output of 2.3 mW.

Pits and projections were formed in the substrate by dry etching (RIE) using the dye-containing layer as a mask, and the dye-containing layer was removed by a stripping liquid. The conditions of the dry etching were as follows:

Etching gas: SF6+CHF3 (1:1)
Stripping liquid: Ethanol

The surface of the substrate manufactured as described above was observed by SEM (scanning electron microscope). As a comparative example, recessed portions were processed, without the aforementioned control exercised, with the laser output of 2.5 mW entirely in the radius range of 25 mm to 40 mm, and thereafter dry etching using the dye-containing layer as a mask was performed; the surface of the substrate was observed by SEM.

As a result, in the implementation example, it was shown that holes having a diameter of approximately 0.3 μm were formed substantially uniformly in the radius range of 25 to 40 mm of the substrate. On the other hand, in the comparative example, it was shown that holes formed in the radius range of 25 to 40 mm of the substrate were such that the holes having a diameter of approximately 0.3 μm were formed in the radius range of 25 mm and the holes having a diameter of approximately 0.4 μm were formed in the radius range of 40 mm. Accordingly, it was proved that the laser output regulation based upon the light quantity of the reflected light contributed to the formation of neatly shaped pattern of pits and projections on the substrate.

The invention claimed is:

1. A method for manufacturing a light emitting element with an improved luminous efficiency with a luminous body, comprising the steps of:
    forming a thermally deformable heat mode recording material layer over a light emission surface; and
    forming a plurality of recessed portions with a pitch between adjacent recessed portions in the recording material layer by a recessed portion forming method which comprises:
        a recessed portion forming step of applying condensed light with a scanning relative motion to the recording material layer to form the recessed portions, the condensed light being emitted from an optical system which includes a light source;
        an inspection light illumination step of applying inspection light only to each recessed portion during or after formation of the recessed portion in the recording material layer;
        a detection step of detecting a light quantity of the inspection light reflected or diffracted from the recessed portion; and
        an output regulation step of regulating an output of the light source based upon the light quantity so that the light quantity becomes a predetermined value.

2. The method for manufacturing a light emitting element according to claim 1, which comprises forming holes corresponding to the recessed portions in the light emission surface by etching using the recording material layer in which the recessed portions have been formed, as a mask.

3. The method for manufacturing a light emitting element according to claim 1, wherein the light emitted from said light source is utilized as the inspection light in the recessed portion forming method.

4. The method for manufacturing a light emitting element according to claim 1, wherein the inspection light is emitted by another light source which is different from said light source in the recessed portion forming method.

5. The method for manufacturing a light emitting element according to claim 1, wherein a pitch of two adjacent recessed portions formed in the recessed portion forming method is in a range of 0.01-100 times a center wavelength of light emitted from the luminous body of the light emitting element.

6. The method for manufacturing a light emitting element according to claim 1, further comprising forming a barrier layer over the recording material layer, wherein the plurality of holes are formed in the recording material layer and the barrier layer.

7. A method for manufacturing an optical element to be mounted over a light emission surface of a light emitting element so as to improve a luminous efficiency of the light emitting element, comprising the steps of:
    forming a thermally deformable heat mode recording material layer over a surface of a supporting member which allows light emitted from the light emitting element to transmit therethrough; and
    forming a plurality of recessed portions with a pitch between adjacent recessed portions in the recording material layer by a recessed portion forming method which comprises:
        a recessed portion forming step of applying condensed light with a scanning relative motion to the recording material layer to form the recessed portions, the condensed light being emitted from an optical system which includes a light source;
        an inspection light illumination step of applying inspection light only to each recessed portion during or after formation of the recessed portions portion in the recording material layer;
        a detection step of detecting a light quantity of the inspection light reflected or diffracted from the recessed portion; and
        an output regulation step of regulating an output of the light source based upon the light quantity so that the light quantity becomes a predetermined value.

8. The method for manufacturing an optical element according to claim 7, which comprises forming holes corresponding to the recessed portions in the surface of the supporting member by etching using the recording material layer in which the recessed portions have been formed, as a mask.

9. The method for manufacturing an optical element according to claim 7, wherein the light emitted from said light source is utilized as the inspection light in the recessed portion forming method.

10. The method for manufacturing an optical element according to claim 7, wherein the inspection light is emitted by another light source which is different from said light source in the recessed portion forming method.

11. The method for manufacturing an optical element according to claim 7, wherein a pitch of two adjacent recessed portions formed in the recessed portion forming method is in a range of 0.01-100 times a center wavelength of light emitted from the light emitting element.

12. The method for manufacturing an optical element according to claim 7, further comprising forming a barrier layer over the recording material layer, wherein the plurality of holes are formed in the recording material layer and the barrier layer.

* * * * *